United States Patent
Takeuchi

(10) Patent No.: US 11,449,030 B2
(45) Date of Patent: Sep. 20, 2022

(54) SOLID SHAPE INFORMATION GENERATION SYSTEM, SOLID SHAPE FORMING APPARATUS, SOLID SHAPE INFORMATION GENERATION METHOD AND PROGRAM

(71) Applicant: SONY CORPORATION, Tokyo (JP)

(72) Inventor: Yuichiro Takeuchi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 108 days.

(21) Appl. No.: 16/627,132

(22) PCT Filed: May 15, 2018

(86) PCT No.: PCT/JP2018/018725
§ 371 (c)(1),
(2) Date: Dec. 27, 2019

(87) PCT Pub. No.: WO2019/008910
PCT Pub. Date: Jan. 10, 2019

(65) Prior Publication Data
US 2020/0183357 A1 Jun. 11, 2020

(30) Foreign Application Priority Data
Jul. 3, 2017 (JP) .............................. JP2017-130364

(51) Int. Cl.
*B33Y 50/02* (2015.01)
*G05B 19/4099* (2006.01)
(Continued)

(52) U.S. Cl.
CPC ........... *G05B 19/4099* (2013.01); *A01G 9/02* (2013.01); *A01G 24/35* (2018.02); *A01G 24/60* (2018.02);
(Continued)

(58) Field of Classification Search
CPC ..... G05B 19/4099; B33Y 50/02; A01G 24/35
(Continued)

(56) References Cited

U.S. PATENT DOCUMENTS

2004/0187714 A1* 9/2004 Napadensky .......... B33Y 40/00
101/35
2014/0227769 A1* 8/2014 Strobbe ................ C12N 5/0607
435/287.1
(Continued)

FOREIGN PATENT DOCUMENTS

JP 2012-501649 A 1/2012
JP 2017-108724 A 6/2017
(Continued)

OTHER PUBLICATIONS

Takeuchi, 3D Printable Hydroponics: A Digital Fabrication Pipeline for Soilless Plant Cultivation, IEEE Access, Published Mar. 15, 2019 (Year: 2019).*

(Continued)

*Primary Examiner* — Gary Collins
(74) *Attorney, Agent, or Firm* — Paratus Law Group, PLLC

(57) ABSTRACT

There is provided a solid shape information generation system to form a solid shape object suitable to cultivate a plant. The solid shape information generation system includes a forming information generator that generates forming information to form a solid shape object used to cultivate a plant using a first material and a second material based on information representing the solid shape object and form an area where at least the plant is sown using the first material whose tensile strength is lower than that of the second material; and an output unit that outputs the forming information for a solid shape forming unit to form the solid shape object.

16 Claims, 16 Drawing Sheets

(51) Int. Cl.
*A01G 24/35* (2018.01)
*A01G 24/60* (2018.01)
*A01G 9/02* (2018.01)
*B29C 67/00* (2017.01)

(52) U.S. Cl.
CPC .............. *B29C 67/00* (2013.01); *B33Y 50/02* (2014.12); *G05B 2219/49246* (2013.01)

(58) Field of Classification Search
USPC .......................................................... 700/98
See application file for complete search history.

(56) References Cited

U.S. PATENT DOCUMENTS

| | | | | |
|---|---|---|---|---|
| 2016/0270310 A1* | 9/2016 | Botman | ................. | A01G 31/02 |
| 2016/0302366 A1* | 10/2016 | Shadowshot | .......... | A01G 9/128 |
| 2016/0330916 A1* | 11/2016 | Budnick | ................. | A01G 9/02 |
| 2017/0079218 A1* | 3/2017 | Novoselac | ............. | A01G 9/042 |
| 2017/0277168 A1* | 9/2017 | Tanaka | ............... | G05B 19/4099 |
| 2018/0296343 A1* | 10/2018 | Wei | ....................... | B29C 64/386 |
| 2018/0325042 A1* | 11/2018 | Yang | .................... | A01G 9/0293 |
| 2018/0370125 A1* | 12/2018 | Rolland | ............... | B29C 64/393 |

FOREIGN PATENT DOCUMENTS

| | | |
|---|---|---|
| WO | WO 2016/031354 A1 | 3/2016 |
| WO | WO 2016/194472 A1 | 12/2016 |

OTHER PUBLICATIONS

Adamski, et al. Inkjet 3D Printed Micropot with Integrated Cantilever-Like Force Sensor for Growing Plant Biological Potential Measurement, presented at Eurosensors 2018 Conference, Graz, Austria, Sep. 9-12, 2018, published Jan. 8, 2019. (Year: 2019).*

Piñeros, et al., Evolving technologies for growing, imaging and analyzing 3D root system architecture of crop plants, Journal of Integrative Plant Biology, Available online on Dec. 18, 2015 at www.wileyonlinelibrary.com/journal/jipb (Year: 2015).*

Khoshnevis, Automated Construction By Contour Crafting—Related Robotics and Information Technologies, Journal of Automation in Construction—Special Issue: The best of ISARC 2002, Jan. 2004, pp. 5-19, vol. 13, Issue 1.

* cited by examiner

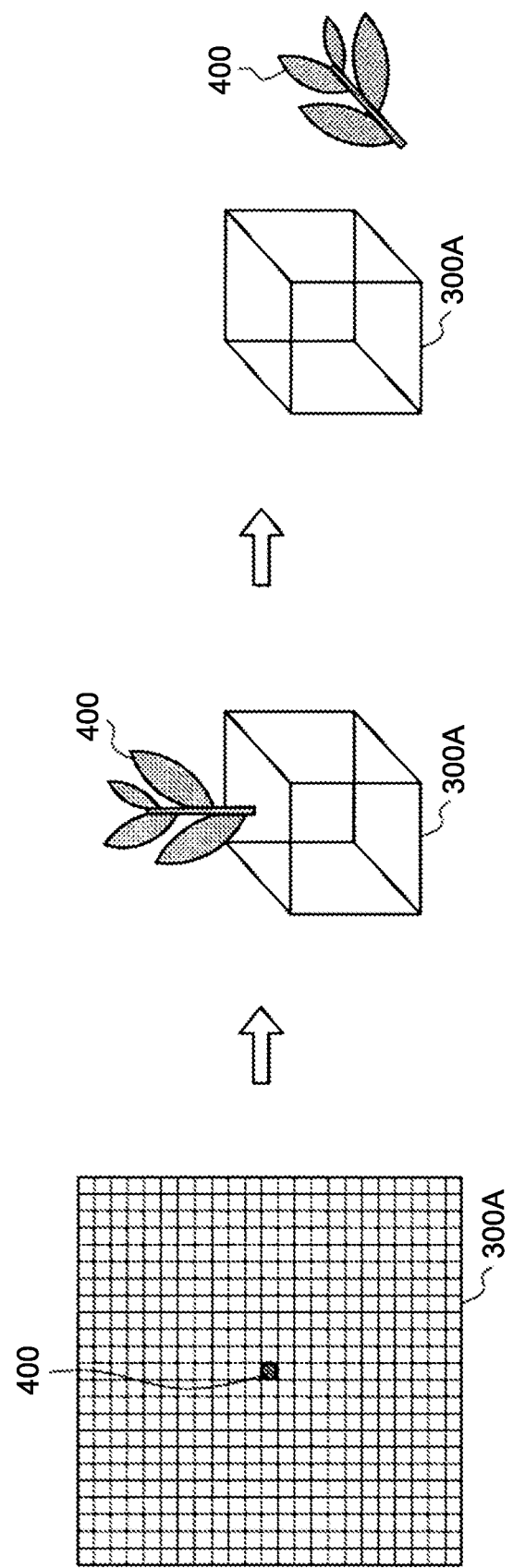

SOLID SHAPE INFORMATION GENERATION SYSTEM, SOLID SHAPE FORMING APPARATUS, SOLID SHAPE INFORMATION GENERATION METHOD AND PROGRAM

CROSS REFERENCE TO PRIOR APPLICATION

This application is a National Stage Patent Application of PCT International Patent Application No. PCT/JP2018/018725 (filed on May 15, 2018) under 35 U.S.C. § 371, which claims priority to Japanese Patent Application No. 2017-130364 (filed on Jul. 3, 2017), which are all hereby incorporated by reference in their entirety.

FIELD

The present disclosure relates to a solid shape information generation system, a solid shape forming apparatus, a solid shape information generation method and a program.

BACKGROUND

In recent years, 3D printing (three-dimensional modeling) techniques enabling formation of given three-dimensional objects have been developing rapidly. Such 3D printing techniques make it possible to form a model having a three-dimensional shape that is input by a user at low cost and therefore are widely used to make samples of a product, parts, etc., or produce models for presentation.

Forming a solid object having a given function using the aforementioned 3D printing techniques has been also examined. For example, forming, for example, living tissue that is implantable in a human body, a robot operable by power supply, and an electronic device in which a touch sensor, etc., are incorporated by 3D printing has been studied. Furthermore, as disclosed in Non-Patent Literature 1, forming a residence structure in which a human can reside by 3D printing has been also studied.

CITATION LIST

Patent Literature

Non Patent Literature 1: Knoshnevis, B., Automated Construction by Contour Crafting-Related Robotics and Information Technologies, Journal of Automation in Construction, vol. 13, no. 1, 2004

SUMMARY

Technical Problem

While the above-described study in 3D printing a biological, machine engineering, electric engineering or civil engineering solid shape object is advancing, 3D printing environmental or ecological solid shape objects for growing natural things, such as plants, has not been examined sufficiently. This is because growing plants requires water and nutrition and therefore there are various limitations on solid shape objects serving as environments to grow plants.

Thus, sufficient knowledges have not been obtained to form a solid shape object that can serve as an environment to grow plants by 3D printing. The disclosure proposes a technique that enables generation of forming information for forming a solid shape object suitable to cultivate plants.

Solution to Problem

According to the present disclosure, a solid shape information generation system is provided that includes: a forming information generator that generates forming information to form a solid shape object used to cultivate a plant using a first material and a second material based on information representing the solid shape object and form an area where at least the plant is sown using the first material whose tensile strength is lower than that of the second material; and an output unit that outputs the forming information for a solid shape forming unit to form the solid shape object.

Moreover, according to the present disclosure, a solid shape forming apparatus is provided that includes: an information acquisition unit that acquires information representing a solid shape object that is used to cultivate a plant; a forming information generator that generates forming information to form the solid shape object using a first material and a second material based on the information, which is acquired by the information acquisition unit, and form an area where at least the plant is sown using the first material whose tensile strength is lower than that of the second material; and a solid shape forming unit that forms the solid shape object based on the forming information.

Moreover, according to the present disclosure, a solid shape information generation method is provided that includes: using a circuit, generating forming information to form a solid shape object used to cultivate a plant using a first material and a second material based on information representing the solid shape object and form an area where at least the plant is sown using the first material whose tensile strength is lower than that of the second material; and outputting the forming information for the solid shape forming unit to form the solid shape object.

Moreover, according to the present disclosure, a program is provided that causes a computer to function as a forming information generator that generates forming information to form a solid shape object used to cultivate a plant using a first material and a second material based on information representing the solid shape object and form an area where at least the plant is sown using the first material whose tensile strength is lower than that of the second material.

According to the disclosure, it is possible to form a solid shape object using a first material and a second material and form an area where a plant is to be sown using the first material having a lower tensile strength.

Advantageous Effects of Invention

As described above, according to the disclosure, it is possible to generate forming information for forming a solid shape object suitable to cultivate a plant.

The above-described effects are not necessarily definitive and, together with the above-described effects or instead of the above-described effects, any one of the effects disclosed in the description or another effect that is perceivable from the description may be achieved.

BRIEF DESCRIPTION OF DRAWINGS

FIG. 6 is an explanatory view illustrating a result of sowing a plant in a solid shape object that is formed using a general resin (a second material).

DESCRIPTION OF EMBODIMENTS

With reference to the accompanying drawings, preferable embodiments of the disclosure will be described in detail below. Note that redundant description of the description and drawings will be omitted by denoting components having substantially like functional configurations with like symbols.

Descriptions will be given in the following order.
1. Solid Shape Forming System
   1.1. Overview
   1.2. Configuration
   1.3. Operations
2. Solid Shape Object
   2.1. Exemplary Configuration
   2.2. Modifications
   2.3. Examples
3. Hardware
4. Conclusion

1. SOLID SHAPE FORMING SYSTEM

1.1. Overview

Figure 1:
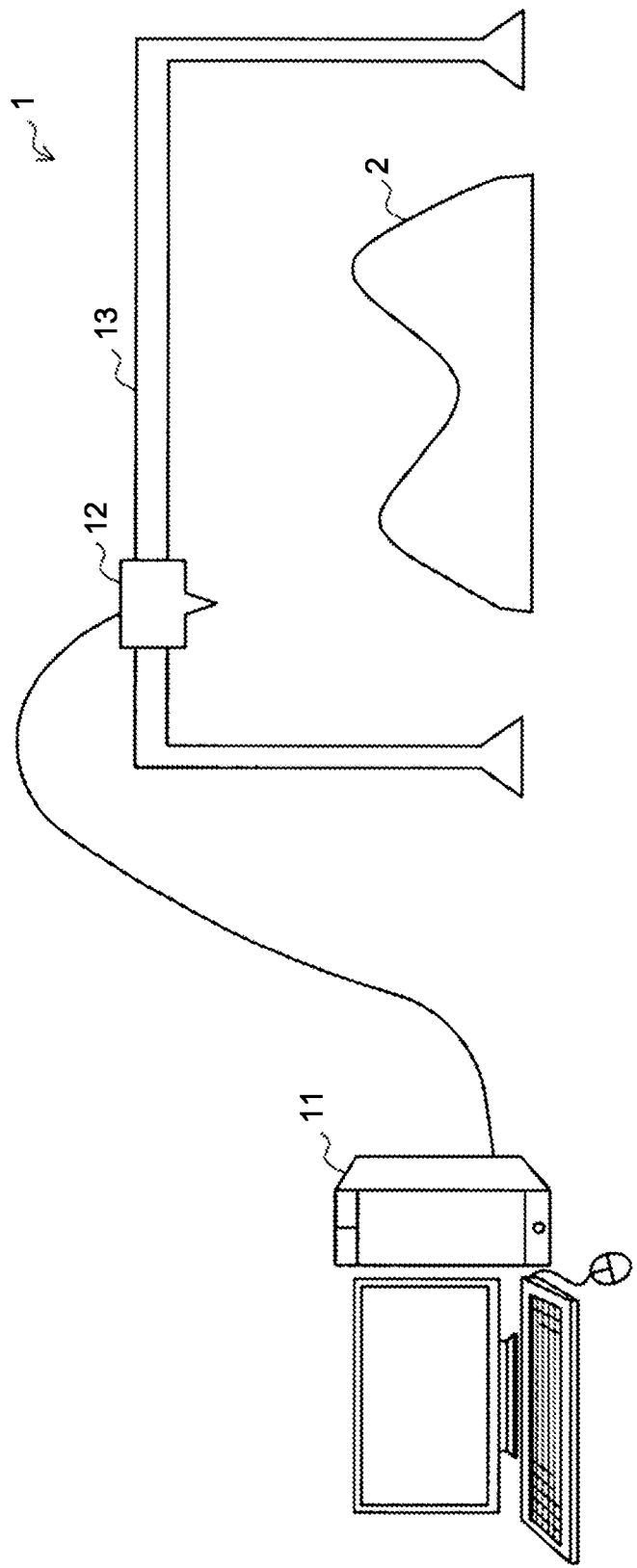
FIG. 1 is a schematic explanatory view to explain an overview of a solid shape forming system according to an embodiment of the disclosure.

First of all, with reference to FIG. 1, an overview of a solid shape forming system according to an embodiment of the disclosure will be described. FIG. 1 is a schematic explanatory view to explain the overview of the solid shape forming system according to the embodiment.

As illustrated in FIG. 1, a solid shape forming system 1 is a system that includes an information processing device 11, a printer 12, and a rail 13 and that is capable of forming a solid shape object 2 having a given solid shape. The solid shape forming system 1 forms the solid shape object 2 using a plurality of materials that are a first material and a second material to be described below. Note that the solid shape forming system 1 may form the solid shape object 2 using another material in addition to the first material and the second material.

The information processing device 11 generates forming information for forming the solid shape object 2 to be formed by the printer 12. Specifically, the information processing device 11 generates forming information for forming the solid shape object 2 using the first material and the second material based on information on the shape of the solid shape object 2 and arrangement of a plant to be cultivated in the solid shape object 2, which is information, for example, input by a user. The forming information that is generated is output to the printer 12 with respect to each of layers that are cut horizontally.

The printer 12 ejects the first material and the second material to form the solid shape object 2. Specifically, the printer 12 acquires the information to form the solid shape object 2 that is output from the information processing device 11 with respect to each of the layers and forms the solid shape object 2 layer by layer. In other words, the printer 12 forms the solid shape object 2 layer by layer and deposits the formed layers, thereby forming the whole solid shape object 2.

The rail 13 is a gantry or a bridge that holds the printer 12 and that is extended in a first direction. For example, the rail 13 moves the held printer 12 in the first direction and the rail 13 is provided movably in a second direction orthogonal to the first direction. Thus, the rail 13 is able to move the printer 12 to a given position on a two-dimensional plane parallel with a horizontal plane.

In other words, the printer 12 and the rail 13 may, for example, form a 3D printer device (that is, a three-dimensional modeling device). As a method of forming a solid shape that is used for the 3D printer device, for example, fused deposition modeling (FDM) method to form a solid shape by depositing layers that are formed by ejecting resin that is resolved by heat, stereolithography to form a solid shape using light curing resin, or the like, and a powder method to form a solid shape by stiffening bedded material powders in layers by sintering using laser, or the like, or firmly fixing the powders using a binder can be exemplified. Alternatively, the 3D printer device may use a solid shape forming method to push a material with high viscosity (such as silicone resin) from a syringe, or the like, by pressure.

The solid shape object 2 is a molded object in which a plant can be cultivated and is used instead of soil. To use the solid shape object 2 (referred to as culture media in hydroponics), it is desirable that the solid shape object 2 be able to hold a plant and water and air necessary to grow a plant, have a pH that is approximately neutral (approximately pH 4 to pH 8) and this is stable, and emit no chemical substances giving adverse effects on growth of a plant.

For example, for example, as a material of culture media used in normal hydroponics, for example, felt formed by condensing and pressing wool yarns and foamable resin, such as urethane foam, can be exemplified. Note that these materials are not suitable to be used in 3D printer devices in respect of control on the shape of the solid shape object, speed at which the shape is formed, and easiness in increasing the scale. On the other hand, as described above, various types of resin, etc., can be exemplified as materials used by 3D printer devices. Note that, roots of a plant does not grow longer easily depending on the properties of resin and thus the materials may be unsuitable to grow a plant.

According to the disclosed technology, the solid shape information generation system generates forming information to form the solid shape object 2 using the first material and the second material and form an area where a plant to be sown using the first material whose tensile strength is lower than that of the second material. Accordingly, in the solid shape object 2 formed by the solid shape forming system 1, it is possible to form an area where a plant is to be sown using the first material whose tensile strength is lower than that of the second material and that allows roots of a plant to grow longer appropriately. Accordingly, the solid shape forming system 1 is able to form the solid shape object 2 preferable to cultivate a plant. Details of the first material and the second material will be described below.

FIG. 1 exemplifies the solid shape forming system 1 in which the information processing device 11 is separated from the printer 12 and the rail 13; however, the technology disclosed herein is not limited to this example. The 3D printer device including the printer 12 and the rail 13 may be a 3D printer device of any mode as long as the 3D printer device is a known 3D printer.

1.2. CONFIGURATION

Figure 2:
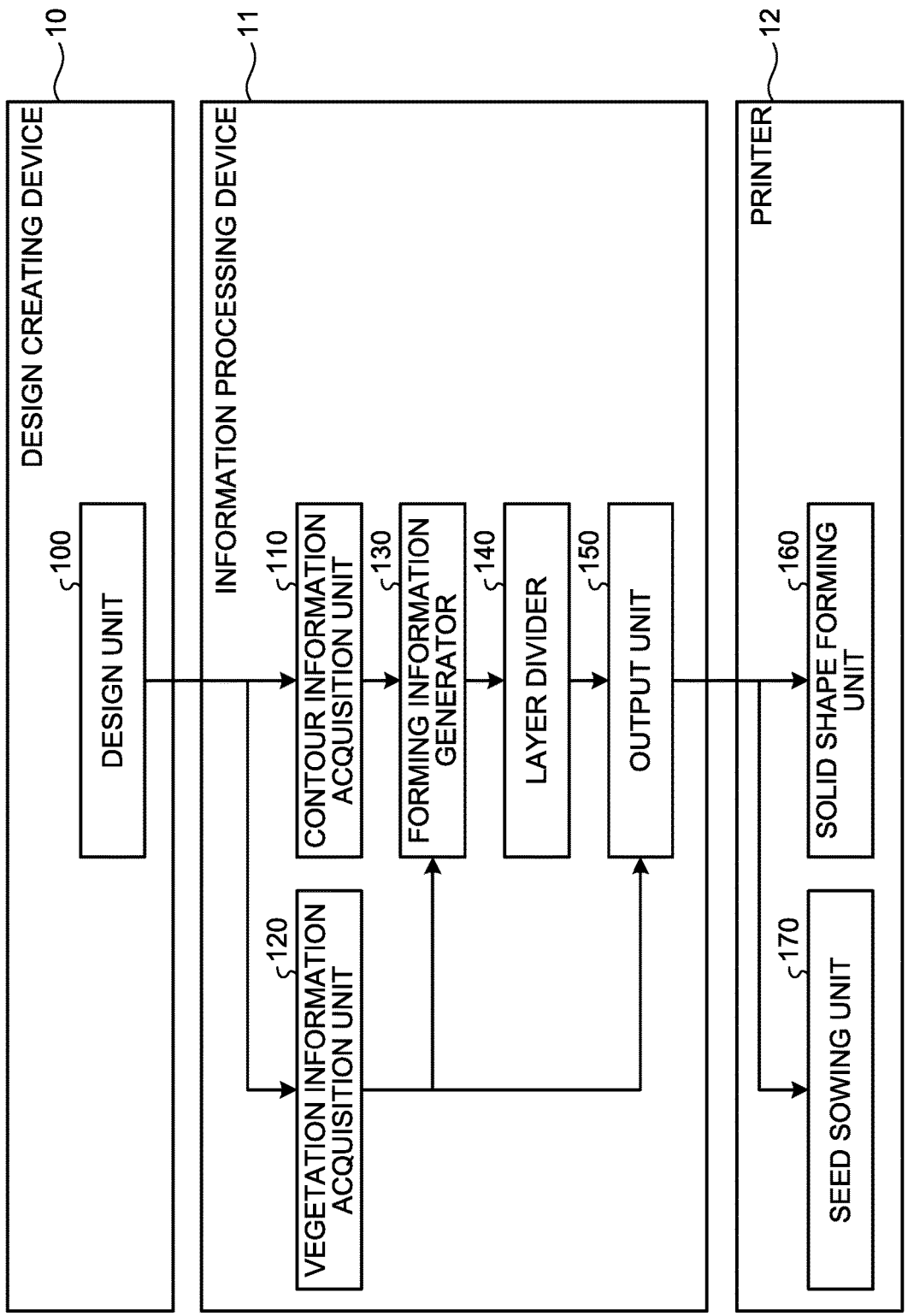
FIG. 2 is a block diagram illustrating a configuration of the solid shape forming system according to the present embodiment.

With reference to FIG. 2, a configuration of the solid shape forming system 1 according to the embodiment will be described. FIG. 2 is a block diagram illustrating the configuration of the solid shape forming system 1 according to the present embodiment. FIG. 2 is a block diagram illustrating the configuration of the solid shape forming system 1 according to the present embodiment.

As illustrated in FIG. 2, the solid shape forming system 1 includes a design creating device 10, the information processing device 11, and the printer 12. The design creating device 10 includes a design unit 100. The information processing device 11 includes a contour information acquisition unit 110, a vegetation information acquisition unit 120, forming information generator 130, a layer divider 140, and an output unit 150. The printer 12 includes a solid shape forming unit 160 and a seed sowing unit 170.

(Design Creating Device 10)

The design unit 100 generates contour information representing the contour of the solid shape object 2 and vegetation information on arrangement of a plant to be cultivated in the solid shape object 2, based on inputs made by the user. Specifically, based on inputs made by the user from an input unit (not illustrated in the drawings) that the design creating device 10 includes, the design unit 100 generates the contour information representing the contour of the solid shape object 2 and the vegetation information on arrangement of a plant to be cultivated in the solid shape object 2. For example, the input unit (not illustrated in the drawings) may be various devices, such as a mouse, a keyboard, a touch pane, and a sensor that senses a behavior of the user to make an input.

The mode of the solid shape object 2 represented by the contour information and the vegetation information that are generated by the design unit 100 is displayed on the display unit (not illustrated in the drawings) that the design creating device 10 includes. For example, the display unit (not illustrated in the drawings) may be a liquid crystal display device, an organic EL (electroluminescence) display device, or the like. This allows the user to design a contour of the solid shape object 2 and arrangement of a plant while checking the mode of the solid shape object 2 to be formed.

Figure 3:
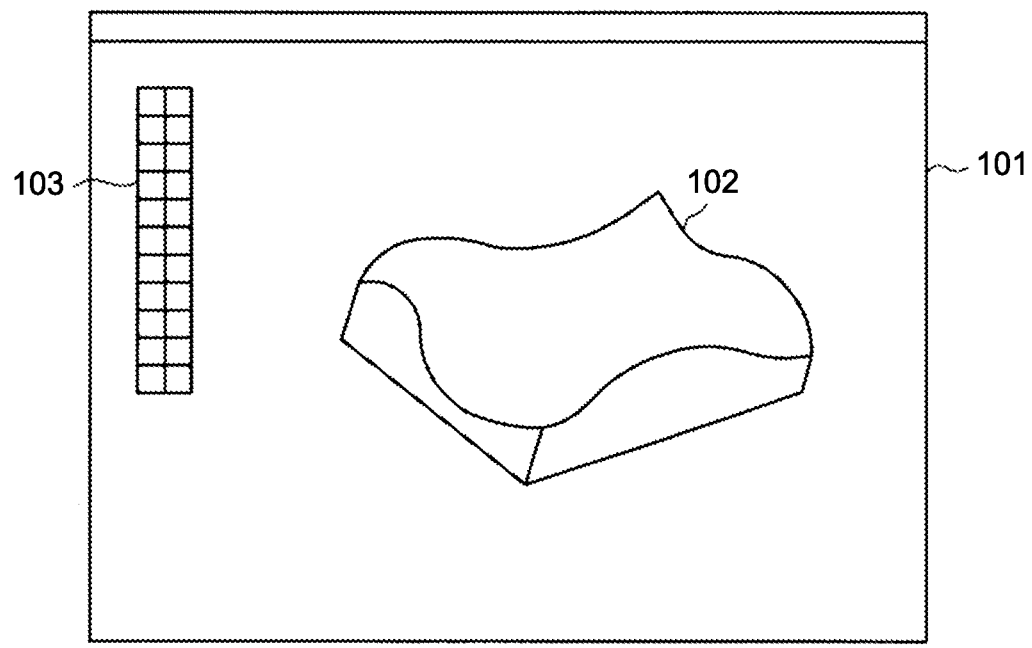
FIG. 3 is an explanatory view illustrating an exemplary input screen for designing a solid shape object that is used to cultivate a plant.
Figure 4:
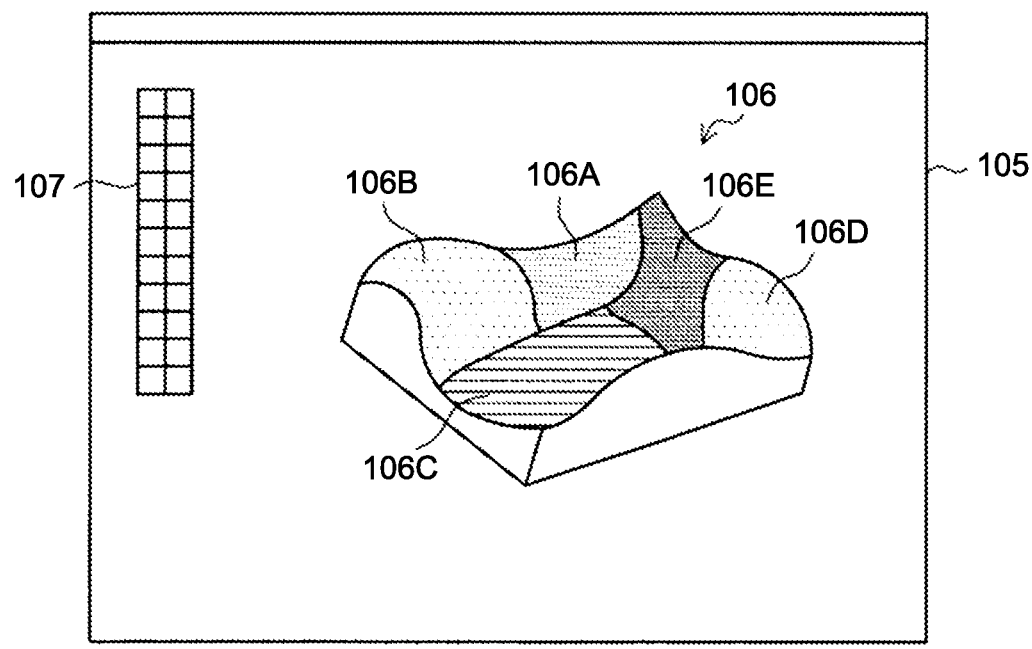
FIG. 4 is an explanatory view illustrating an exemplary input screen for designing arrangement of plants to be cultivated in the solid shape object.

With reference to FIGS. 3 and 4, an input screen for designing the solid shape object 2 that is displayed on the display unit of the design creating device 10. FIG. 3 is an explanatory view illustrating an exemplary input screen for designing the solid shape object 2 that is used to cultivate a plant. FIG. 4 is an explanatory view illustrating an exemplary input screen for designing arrangement of plants to be cultivated in the solid shape object 2. The user is able to design the shape of the solid shape object 2 and arrangement of plants freely by making inputs using the input unit that the design creating device 10 includes.

An input screen 101 illustrated in FIG. 3 is a screen for designing the solid shape object 2. To the input screen 101, for example, an object 102 representing the contour of the solid shape object 2 is input. Furthermore, on the input screen 101, an icon group 103 to choose various tools supporting input of the object 102 may be provided. For example, the various tools supporting input of the object 102 may include a tool to generate an object having a basic three-dimensional shape, such as a quadrangular prism or a circular cylinder, a tool to extend the input object partly, a modification tool, an enlarging tool, a reducing tool, etc. The various tools may further include an extrude tool to exclude a given two-dimensional shape that is drawn and gives volume to the two-dimensional shape to generate a three-dimensional object. The various tools are not limited to the aforementioned ones, and the various tools may include any tool as long as the tool is used in known 3D modeling software, etc. According to the input screen 101, the user is able to instinctively design and input a contour of the solid shape object 2.

As for the design unit 100, for example, after the input screen 101 illustrated in FIG. 3, an input screen 105 illustrated in FIG. 4 is displayed on the display unit.

The input screen 105 is a screen to design arrangement of plants to be cultivated in the solid shape object 2. To the input screen 105, for example, an object 106 where arrangement of plants to be cultivated in the solid shape object 2 is set is input. Specifically, the user colors the object 106 differently to set desired areas 106A to 106E, which makes it possible to input plants to be cultivated in each of the areas. Furthermore, in the input screen 105, an icon group 107 to choose a plant that can be arranged in the object 106 may be provided. For example, the user chooses a plant from the icon group 107 and then specifies one of the areas 106A to 106E, which makes it possible to set an area where the chosen plant is to be cultivated. The user may set an area in which a plant that is chosen is cultivated by, after choosing the plant from the icon group 107, coloring the object 106 with a color corresponding to the chosen plant. According to the input screen 105, the user is able to instinctively set arrangement of plants to be cultivated in the solid shape object 2.

(Information Processing Device 11)

The contour information acquisition unit 110 acquires contour information representing the contour of the solid shape object 2. Specifically, the contour information acquisition unit 110 is an input interface to which contour information representing the contour of the solid shape object 2 that is output from the design creating device 10 is input. For example, the contour information acquisition unit 110 may be a circuit that reads the stored contour information from a memory or a storage medium or may be a wired or wireless external interface to which the contour information is input from the outside, such as a universal serial bus (USB) interface, an Ethernet (trademark) interface, or an interface according to the IEEE802.11 standards. The contour information may, for example, contain information representing a contour of a given solid shape object that is input by the user. Such contour information is, for example, generated by the above-described design unit 100, and such contour information may be generated by known three-dimensional modeling software.

The vegetation information acquisition unit 120 acquires the vegetation information on arrangement of a plant in the solid shape object 2. Specifically, the vegetation information acquisition unit 120 is an input interface to which the vegetation information on arrangement of a plant in the solid shape object 2 that is output from the design creating device 10 is input. For example, as the contour information acquisition unit 110 is, the vegetation information acquisition unit 120 may be a circuit that reads the stored vegetation information from a memory or the storage medium or may be a wired or wireless external interface to which the vegetation information is input from the outside, such as an USB interface, an Ethernet (trademark) interface, or an interface according to the IEEE802.11 standards. The vegetation information, for example, contains information on the type of plant to be cultivated in the solid shape object 2, the area where the plant is to be cultivated, and arrangement thereof. Such vegetation information may be generated by the above-described design unit 100.

The forming information generator 130 generates forming information for forming the solid shape object 2. Specifically, the forming information generator 130 generates the forming information for generating the solid shape object 2 based on the contour information representing the contour of the solid shape object 2 and the vegetation information on arrangement of a plant to be cultivated in the solid shape object 2. The forming information, for example, contains information specifying the contour, internal structure, and forming material of the solid shape object 2.

In the information processing device 11 according to the present embodiment, the forming information generator 130 generates forming information to form the solid shape object 2 using the first material and further generates forming information to form the area where at least a plant is sown and cultivated using the first material having a lower tensile strength. In other words, the forming information generator 130 not only generates information for forming the contour and internal structure of the solid shape object 2 based on the shape information with a 3D printer but also generates information to specify a material to form the solid shape object 2 based on the vegetation information.

The first material and the second material are materials each of which is usable in the 3D printer device; however, note that the first material is a material that has a tensile strength lower than that of the second material and that is destroyed easily. The first material is used to form the area where a plant is to be sown and cultivated in the solid shape object 2 and therefore a material that has a tensile strength lower than that of the second material and that is destroyed easily is used to allow roots of the plant to grow longer easily. Alternatively, the first material may be a material that has a Young's modulus lower than that of the second material and that deforms easily or a material that has an adhesive strength between layers lower than that of the second material and that deforms the structure easily.

Furthermore, the forming information generator 130 may generate forming information to form the area where the plant is to be sown and cultivated in the solid shape object 2 into a three-dimensional meshed structure. The three-dimensional meshed structure has a large number of void spaces in which roots of the plant and air and water necessary for the plant to grow can be retained in the structure, which easily meets conditions preferable to an environment to grow the plant.

The meshes of the three-dimensional meshed structure may be formed into any shape and, for example, may be formed into any one of a triangular shape, a quadrangular shape, a hexagonal shape, and a circular shape. The meshes of the three-dimensional meshed structure may be formed into a combination of a plurality of shapes and may be formed into random shapes.

The size of meshes of the three-dimensional meshed structure may be set based on the type of plant to be cultivated in the area of the three-dimensional meshed structure. When the size of meshes of the three-dimensional meshed structure is extremely smaller than that of roots of the plant, there is a possibility that roots of the plant to be cultivated may be not allowed to grow longer sufficiently into the three-dimensional meshed structure. When the size of meshes of the three-dimensional meshed structure is extremely larger than that of roots of the plant, there is a possibility that the plant to be cultivated cannot absorb moisture and nutrition sufficiently in the three-dimensional meshed structure. When the size of meshes of the three-dimensional meshed structure is extremely larger than that of seeds of the plant to be cultivated, there is a possibility that seeds are not held on the surface of the three-dimensional meshed structure. Thus, the size of meshes of the three-dimensional meshed structure may be set based on the size of at least any one of roots and seeds of the plant to be cultivated.

Specifically, the size of meshes of the three-dimensional meshed structure may be 0.1 mm to 10 mm. For example, when a plant to be cultivated in the solid shape object 2 is a herb, the size of meshes of the three-dimensional meshed structure can be 0.2 mm to 1 mm. When the plant to be cultivated in the solid shape object 2 is tomato, or the like, the size of meshes of the three-dimensional meshed structure can be 2 mm to 3 mm. When the plant to be cultivated in the solid shape object 2 is watermelons, or the like, the size of meshes of the three-dimensional meshed structure can be 4 mm to 6 mm.

Information on the sizes of seeds and roots of the plant to be cultivated in the solid shape object 2 may be, for example, acquired from an external or internal database that stores the sizes of seeds and roots of plant with respect to each type.

Figure 5A:
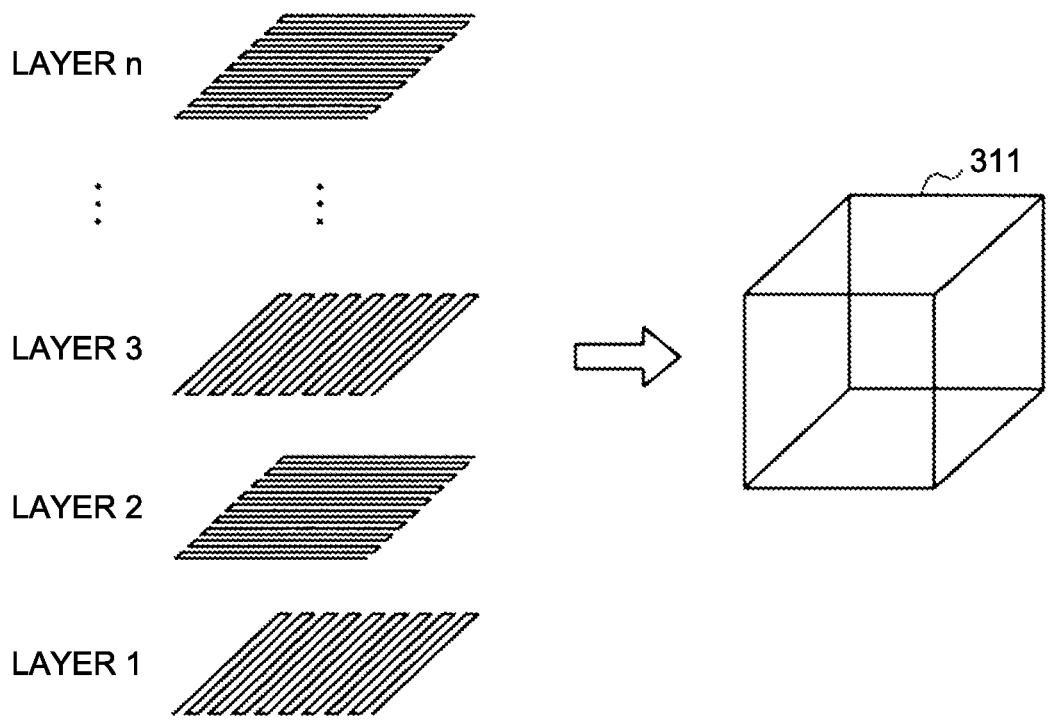
FIG. 5A is an explanatory view illustrating an exemplary method of forming a three-dimensional meshed structure that is performed by the solid shape forming system.
Figure 5B:
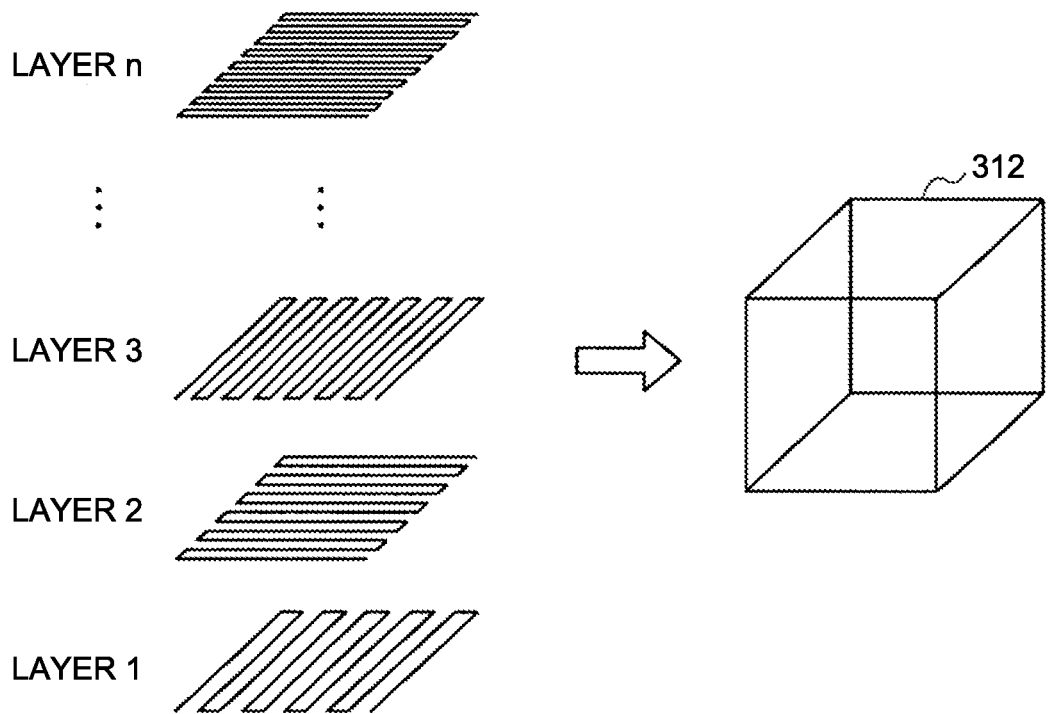
FIG. 5B is an explanatory view illustrating another exemplary method of forming a three-dimensional meshed structure that is performed by the solid shape forming system.

With reference to FIGS. 5A and 5B, a specific method of forming a three-dimensional meshed structure will be described. FIG. 5A is an explanatory view illustrating an exemplary method of forming a three-dimensional meshed structure that is performed by the solid shape forming system 1. FIG. 5B is an explanatory view illustrating another exemplary method of forming a three-dimensional meshed structure that is performed by the solid shape forming system 1.

As illustrated in FIG. 5A, the solid shape forming system 1 forms the solid shape object 2 as a two dimensional shape layer by layer and deposits each of the formed layers, thereby forming a solid (three-dimensional) shape. Specifically, the solid shape forming system 1 may form a solid shape object 311 that is a three-dimensional meshed structure by depositing a layer formed by scanning in a zigzag by making round trips in a first direction and a layer formed by scanning in a zigzag by making round trips in a second direction orthogonal to the first direction alternately for n times.

As illustrated in FIG. 5B, the solid shape forming system 1 may form a solid shape object 312 that is a three-dimensional meshed structure where the number of times of round trips is smaller in lower layers (in FIG. 5B, for example, Layer 1) and the number of times of round trips is larger in upper layers (in FIG. 5B, for example, Layer n). According to this, the solid shape object 312 illustrated in FIG. 5B may be formed such that the size of meshes is rougher (larger) in a lower part of the three-dimensional meshed structure.

In the case illustrated in FIG. 5B, as void spaces in the solid shape object 312 increases as roots of the plant sown on an upper part of the solid shape object 312 grows longer downward, the roots are allowed to grow longer easier in association with growth of roots and thus the plant are allowed to grow longer. Furthermore, in such a case, in the upper part of the solid shape object 312, the size of meshes of the three-dimensional meshed structure can be a size enabling seeds of the plant to be held on the surface of the three-dimensional meshed structure and the internal void spaces can be increased more.

The forming information generator 130 may generate forming information to form a pit (in other words, a dent or concave) in a position where seeds of the plant are sown in the three-dimensional meshed structure of the solid shape object 2. For example, when seeds of the plant are sown on an oblique surface of the solid shape object 2, there is a possibility that the seeds may tumble and move from the position in which the seeds are sown. For this reason, the forming information generator 130 may form a pit in a size capable of storing seeds to be sown in the position in which the seeds are sown on the surface of the three-dimensional meshed structure y according to the forming information.

The layer divider 140 divides the solid shape object 2 into multiple layers having horizontal cross-sectional surfaces and divides the forming information according to each of the layers. Specifically, the layer divider 140 divides the shape of the solid shape object 2, which is represented by the forming information generated by the forming information generator 130, into horizontally-cut layers and generates forming information to form each of the layers obtained by dividing the solid shape object 2.

In the solid shape forming system 1, the solid shape forming unit 160 forms the solid shape object 2 as a multi-layered object by additive fabrication. By converting the forming information that is generated by the forming information generator 130 into forming information on each layer, the layer divider 140 enables the solid shape forming unit 160 to form the solid shape object 2. Such a function of the layer divider 140 can be generally referred to as slicing software.

The layer divider 140 may be included not by the information processing device 11 but by the printer 12. In such a case, the output unit 150 may output the forming information that is generated by the forming information generator 130 to the layer divider 140.

The output unit 150 outputs the forming information to form the solid shape object 2 layer by layer. Specifically, the output unit 150 is an output interface that outputs the forming information on each of the multiple layers divided by the layer divider 140. The output unit 150 may output the vegetation information on the solid shape object 2 that is acquired by the vegetation information acquisition unit 120 to the seed sowing unit 170. Specifically, the output unit 150 may output information on arrangement of the plant to be sown and cultivated in the solid shape object 2 to the seed sowing unit 170. For example, the output unit 150 may be a circuit that output the vegetation information to a memory or a storage medium or a wired or wireless external interface that outputs the vegetation information to the outside, such as an USB interface, an Ethernet (trademark) interface, or an interface according to the IEEE802.11 standards.

(Printer 12)

The solid shape forming unit 160 forms the solid shape object 2 by additive fabrication. Specifically, the solid shape forming unit 160 acquires the forming information for the solid shape object 2 with respect to each layer that is output from the output unit 150 and forms the solid shape object 2 layer by layer based on the forming information. For example, the solid shape forming unit 160 may be a 3D printer head that forms the solid shape object 2.

The solid shape forming unit 160 may be a plurality of printer heads that eject the same material or different materials. When the solid shape forming unit 160 is a plurality of printer heads that eject the same material, forming the solid shape object 2 using the printer heads simultaneously can increase the speed at which the solid shape object 2 is formed. On the other hand, when the solid shape forming unit 160 is a plurality of printer heads that eject different materials, ejecting each of the first material and the second material with the printer heads makes it possible to form the solid shape object 2 more suitable to cultivate the plant.

The method for the solid shape forming unit 160 to form the solid shape object 2 is not particularly limited as long as the method is one type of additive fabrication. For example, the solid shape forming unit 160 may form the solid shape object 2 using the fused deposition modeling (FDM) method; stereolithography to form a solid shape using light curing resin; the powder method to form a solid shape by stiffening material powders by sintering using laser, or the like, or firmly fixing the powders using a binder; or a method of forming a solid shape by pushing out a material having viscosity from a syringe.

Any material may be used as the first material and the second material that are ejected from the solid shape forming unit 160 as long as the solid shape object 2 can be formed from the material. Note that, a material whose at least any one of tensile strength and Young's modulus is lower than that of the second material and in which deformation and break occur more easily than in the second material is selected as the first material.

The first material is used to form the area where a plant is to be sown and cultivated in the solid shape object 2 and therefore a material whose tensile strength is lower than that of the second material and that is broken more easily than the second material is is used to allow roots of the plant to grow longer easily. Alternatively, the first material may be a material whose Young's modulus is lower than that of the second material and that deforms more easily than the second material does or a material whose adhesive strength between layers is lower than that of the second material and whose structure deforms more easily than the second material does.

Specifically, the first material and the second material may be plastic resin, silicone resin, or sintered ceramics or metal. For example, when the solid shape object 2 is formed by, for example, fused deposition modeling, thermoplastic resins, such as acrylonitrile butadiene styrene resin (ABS resin), polylactide resin (PLA resin) or polycarbonate resin, may be used as the first material and the second material. Impurities, such as woodchips, may be mixed into the thermoplastic resins. To form the solid shape object 2 by stereolithography, ultraviolet-curing resins, such as acryl resin or epoxy resin, may be used as materials. To form the solid shape object 2 by the powder method, organic resin, such as nylon, and metal, such as bronze, steel, nickel or titan, may be used as materials. To form the solid shape object 2 by pushing out the viscous material from the syringe, silicone resins, or the like, may be used as materials.

For example, the first material may be a material that is turned porous before a plant is sown. In other words, the first material may be a material that is a mixture of multiple materials when the solid shape object 2 is formed and that is a mixed material on which any one of sets of post processing is performed and that accordingly dissolves or disappear partly and thus is turned porous.

More specifically, the first material may be a thermoplastic resin that is a mixture of water-soluble resin, such as polyvinyl alcohol (PVA), and water-insoluble resin, such as rubber elastomer. After being formed into the solid shape object 2, such a first material is soaked into water to cause only PVA to dissolve so that a porous material where only rubber elastomer remains can be realized. PVA that is part of the material dissolves after the solid shape object 2 is formed and thus the first material has a density lower than that of a single rein and has a lower tensile strength and a lower Young's modulus. In addition to this, in such a first material, the resin causing layers to adhere with each other partly dissolves and accordingly the adhesive strength between layers is also low. Accordingly, forming the area where a plant is to be sown and cultivated in the solid shape object 2 using the first material that is broken or deforms easily allows roots of the plant to grow longer easily.

Figure 7:
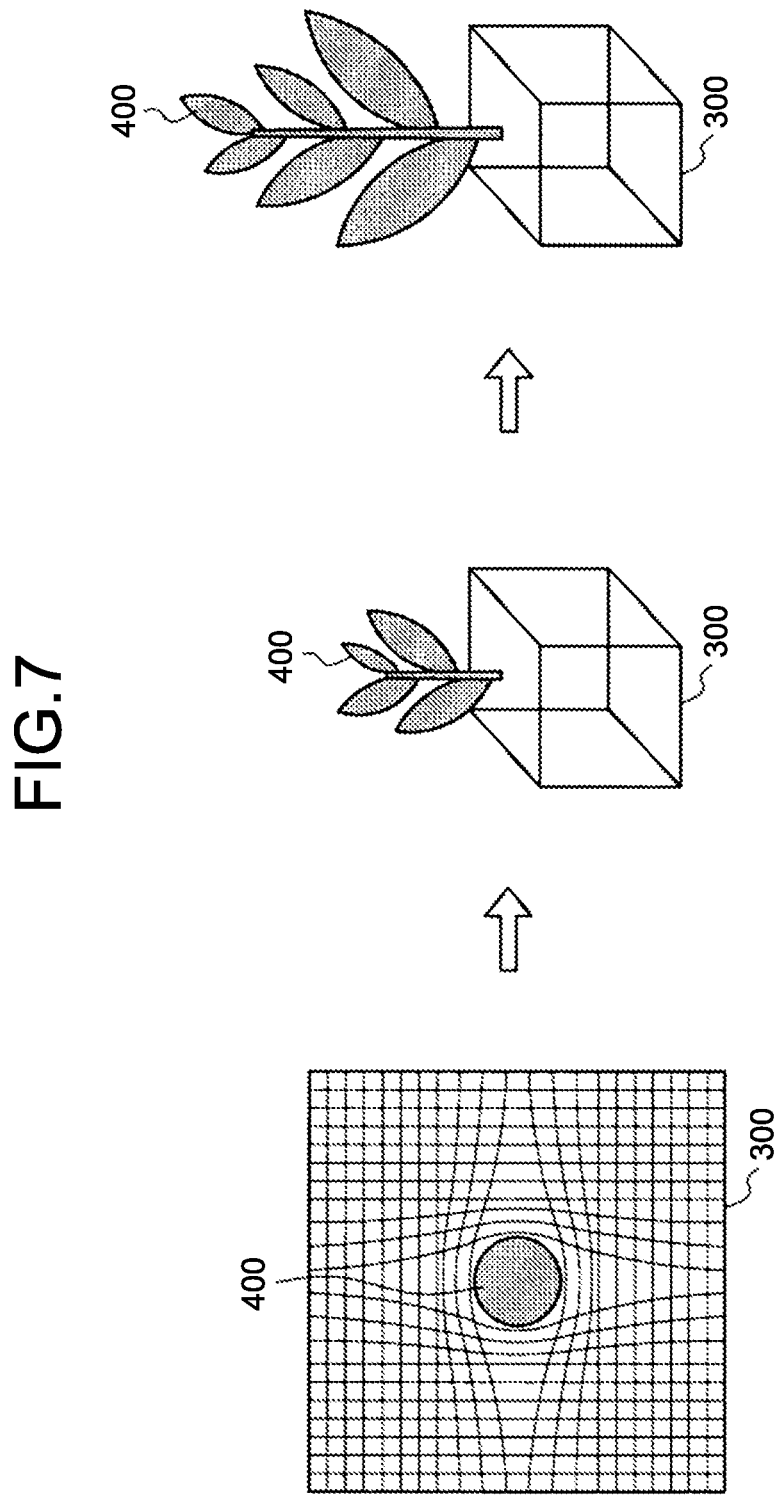
FIG. 7 is an explanatory view illustrating a result of sowing a plant in a solid shape object that is formed using a first material.
Figure 8:
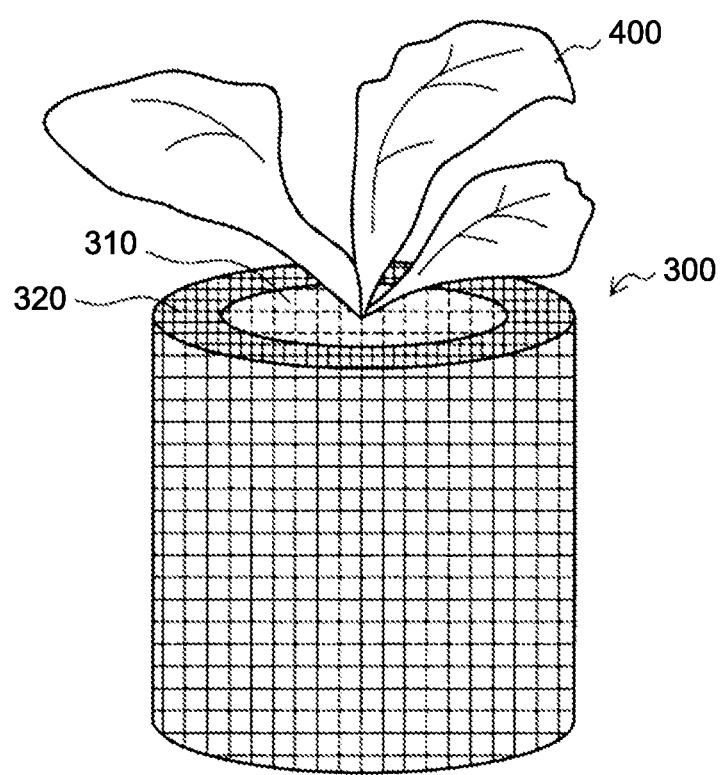
FIG. 8 is a perspective view illustrating exemplary use of the first material and the second material in the solid shape object.

With reference to FIGS. 6 to 8, this will be described more in detail. FIG. 6 is an explanatory view illustrating a result of sowing a plant 400 in a solid shape object 300A that is formed using a general resin (the second material). FIG. 7 is an explanatory view illustrating a result of sowing the plant 400 in a solid shape object 300 formed using the first material. FIG. 8 is a perspective view illustrating exemplary use of the first material and the second material in the solid shape object 300.

As illustrated in FIGS. 6 and 7, for example, when the plant 400 is sown in the solid shape object 300A or the solid shape object 300 that is formed into a three-dimensional meshed shape, the plant 400 grows the roots longer into the meshes of the three-dimensional meshed structure and grows accordingly.

As illustrated in FIG. 6, however, when the solid shape object 300A is formed using the second material that does not deform or is not broken easily, roots of the plant 400 in a position serving as a point of contact with the solid shape object 300A do not tend to be larger than the meshes of the three-dimensional meshed structure. For this reason, the plant 400 cannot support its weight on the roots when the plant 400 grows to some extent and accordingly bends and falls.

On the other hand, as illustrated in FIG. 7, when the solid shape object 300 is formed of the first material that deforms or is broken easily, roots of the plant 400 in a position serving as a point of contact with the solid shape object 300 deform or break the meshes of the three-dimensional meshed structure, which allow the roots to grow longer. This allows the plant 400 to support its weight on the roots even when the plant 400 grows to some extent and accordingly to grow longer.

As the magnitude of force of the roots growing larger differs depending on the type of plant, the tensile strength, the Young's modulus and the adhesive strength between layers of the first material may be set based on the type of plant to be cultivated in the solid shape object 2. For example, as it is assumed that plants whose roots and stems grow thicker have greater force of roots growing longer, a material whose tensile strength, Young's modulus and adhesive strength between layers are relatively high may be used as the first material. Even in such a case, needless to say, the first material is a material whose tensile strength, Young's modulus and adhesive strength between layers are lower than those of the second material and that thus deforms and is broken easily.

For example, as illustrated in FIG. 8, in the solid shape object 300, an area 310 where the plant 400 is to be sown and cultivated is formed using the first material and an outer circumferential area 320 may be formed using the second material. In such a case, forming the area 310 where the plant 400 is to be sown and cultivated using the first material that deforms and is destroyed easily while maintaining the strength of the solid shape object 300 by forming the outer circumferential area 320 using the second material makes it possible to grow the plant 400 without preventing the roots to grow longer. According to the above description, the solid shape object 300 is formed using the first material and the second material; however, when the strength of the solid shape object 300 can be maintained using only the first material, the solid shape object 300 may be formed using only the first material.

The seed sowing unit 170 sows seeds of the plant in the solid shape object 2. Specifically, the seed sowing unit 170 acquires vegetation information on arrangement of the plant to be grown in the solid shape object 2 from the output unit 150 and sows the seeds of the plant in the solid shape object 2 based on the vegetation information. For example, the seed sowing unit 170 may be a 3D printer head that is included by the printer 12 and that sows seeds of the plant in the solid shape object 2.

The seed sowing unit 170 may be configured using any mechanism as long as the seed sowing unit 170 is able to store a plurality of types of seeds and sow seeds selectively. For example, the seed sowing unit 170 may include a plurality of seed storage chambers and a mechanism to drop seeds of a given type of plant from a seed storage chamber on the solid shape object 2 and sow seeds in the solid shape object 2.

Figure 9:
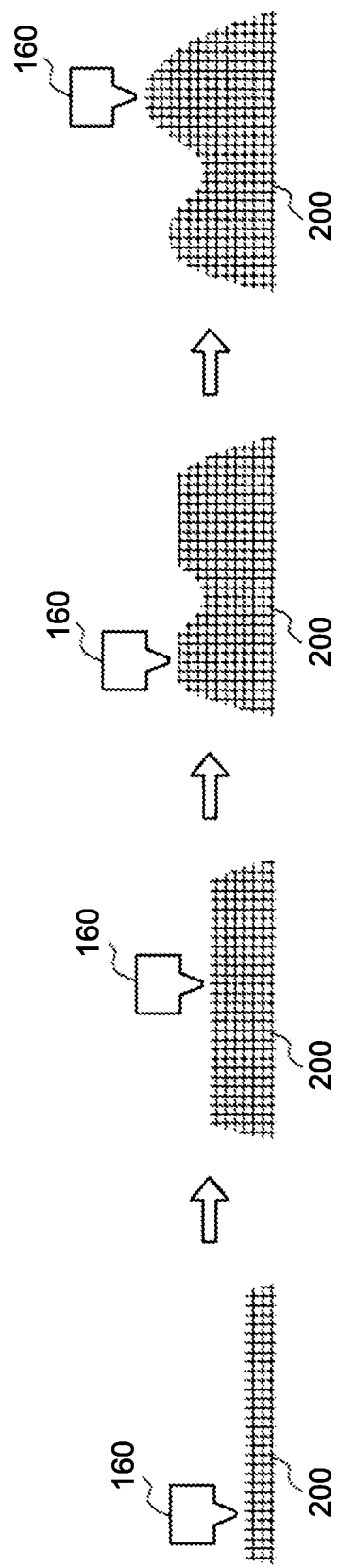
FIG. 9 is an explanatory view to explain a method of forming a solid shape object that is performed by a solid shape forming unit.
Figure 10:
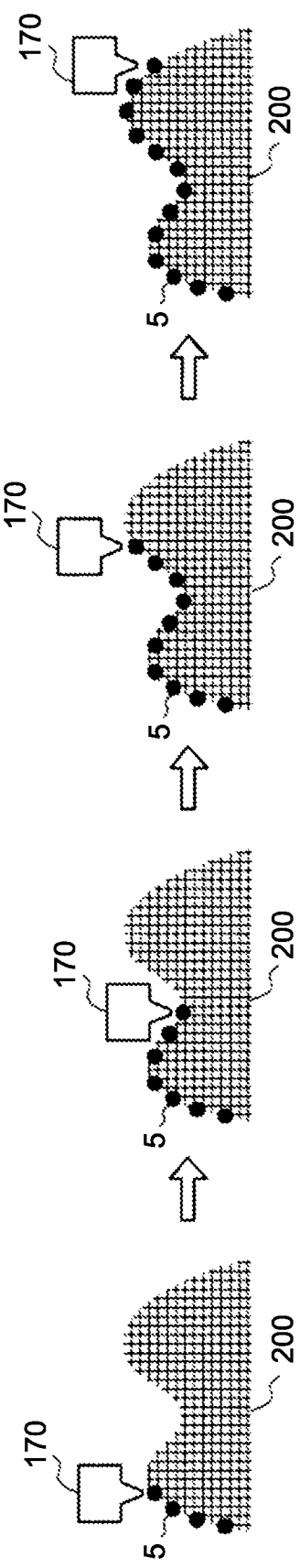
FIG. 10 is an explanatory view to explain a method of sowing plat seeds in a solid shape object that is performed by a seed sowing unit.

With reference to FIGS. 9 and 10, forming the solid shape object 2 by the printer 12 will be described. FIG. 9 is an explanatory view to explain a method of forming the solid shape object 2 that is performed by the solid shape forming unit 160. FIG. 10 is an explanatory view to explain a method of sowing seeds of a plant in the solid shape object 2 that is performed by the seed sowing unit 170.

As illustrated in FIG. 9, the solid shape forming unit 160 forms a solid shape object 200 from the lower side layer by layer. Specifically, the solid shape forming unit 160 may form the solid shape object 200 that is a three-dimensional meshed structure by forming a meshed structure from the lower side layer by layer.

As illustrated in FIG. 10, the seed sowing unit 170 sows seeds 5 of a plant to be cultivated in the solid shape object 200 based on arrangement of the plant in the solid shape object 200. Specifically, the seed sowing unit 170 sows the seeds 5 in the solid shape object 200 by ejecting the seeds 5 of the plant that are wrapped by gel, or the like, to the solid shape object 200 at intervals and density optimum to growth of the plant. Any material may be used as the gel wrapping the seeds 5 of the plant as long as the gel does not hinder growth of the plant, and, for example, sodium polyacrylate may be used.

A pit may be provided in the positon in which the seeds 5 of the plant are sown in the solid shape object 2. This allows the gel containing the seeds 5 and ejected from the seed sowing unit 170 to be stationarily placed easily in the solid shape object 2, which makes it possible to sow the plant in the surface of the solid shape object 2 more accurately.

The seed sowing unit 170 may be a 3D printer head in which a plurality of syringes are put together in parallel. According to this, it is possible to simultaneously sow the seeds 5 of more types of plant in the solid shape object 2. The seed sowing unit 170 may be, for example, a 3D printer head including a syringe that ejects the seeds 5 of the plant that are wrapped with gel, or the like, by air pressure.

According to the configuration above, the solid shape forming system 1 according to the present embodiment is able to form the solid shape object 2 that allows roots of a plant to grow longer easily by forming the area where the plant is sown and grown using a material that deforms or is broken easily. Accordingly, the solid shape forming system 1 is able to form the solid shape object 2 more suitable to cultivate the plant.

1.3. OPERATIONS

Figure 11:
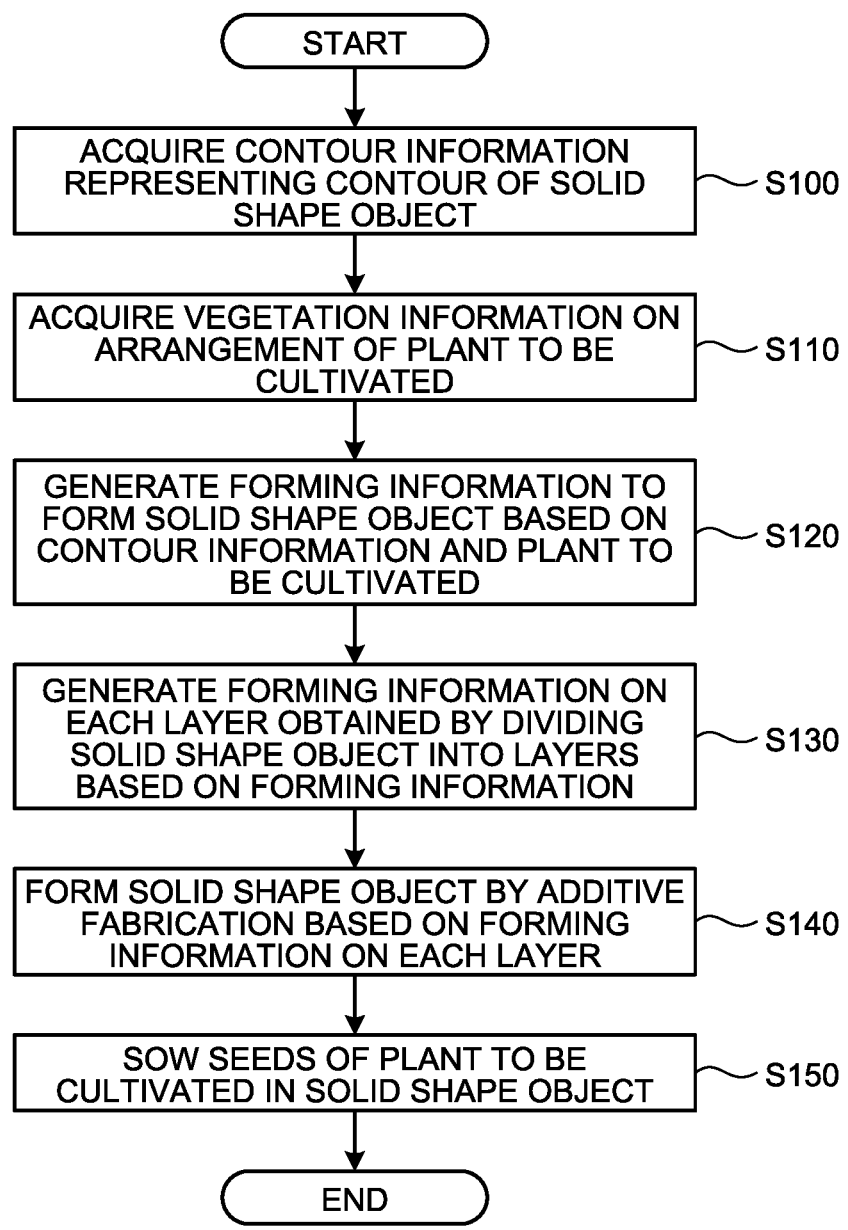
FIG. 11 is a flowchart illustrating a flow of operations of the solid shape forming system according to the present embodiment.

With reference to FIG. 11, exemplary operations of the solid shape forming system 1 according to the present embodiment will be explained. FIG. 11 is a flowchart illustrating a flow of operations of the solid shape forming system 1 according to the present embodiment.

As illustrated in FIG. 11, first of all, the contour information acquisition unit 110 acquires contour information representing a contour of a solid shape object. Specifically, the contour information that is designed by a user is input from the design unit 100 to the contour information acquisition unit 110 (S100). Similarly, vegetation information on arrangement of a plant to be grown in the solid shape object is input from the design unit 100 to the vegetation information acquisition unit 120 (S110). The order of S100 and S110 may be reversed. Based on the contour information and the vegetation information that are input at S100 and S110, the forming information generator 130 generates forming information for forming the solid shape object 2 (S120). Subsequently, based on the generated forming information, the layer divider 140 generates information to form each of the layers obtained by dividing the solid shape object 2 into layers (S130).

The output unit 150 outputs the generated forming information on each of the layers to the solid shape forming unit 160 and the solid shape forming unit 160 forms the solid shape object 2 by additive fabrication based on the information to form each of the layers (S140). For example, the solid shape forming unit 160 may form the solid shape object 2 from the lower side by layer-by-layer deposition. The seed sowing unit 170 sows seeds of the plant based on the vegetation information in the formed solid shape object 2 (S150). For example, the seed sowing unit 170 may plant the seeds 5 at intervals and density optimum to growth in the solid shape object 2 that is formed by the solid shape forming unit 160.

The operations above enable the solid shape forming system 1 according to the present embodiment to form the solid shape object 2 appropriate to cultivate the plant. The solid shape forming system 1 is able to cultivate the plant in the solid shape object 2 by sowing the seeds 5 of the plant in the formed solid shape object 2.

2. SOLID SHAPE OBJECT

2.1. Exemplary Configuration

Figure 12:
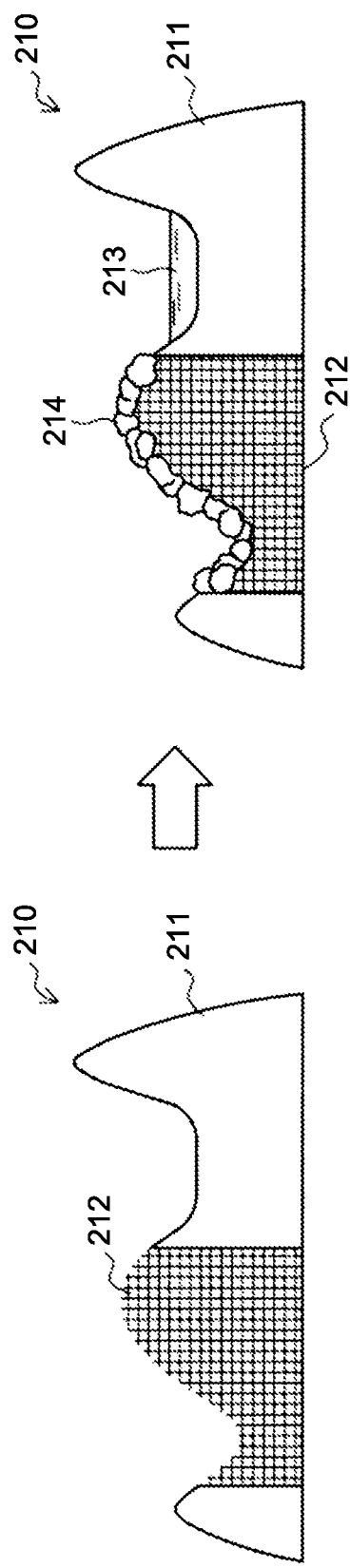
FIG. 12 is an explanatory view illustrating an exemplary configuration of the solid shape object that is formed by the solid shape forming system
Figure 13:
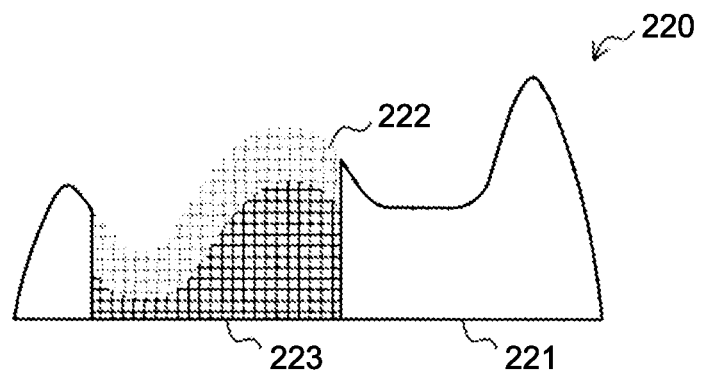
FIG. 13 is an explanatory view illustrating another exemplary configuration of the solid shape object that is formed by the solid shape forming system.

With reference to FIGS. 12 and 13, an exemplary configuration of the solid shape object that is formed by the solid shape forming system 1 according to the present embodiment will be described more specifically. FIG. 12 is an explanatory view illustrating an exemplary configuration of the solid shape object that is formed by the solid shape forming system 1 according to the present embodiment. FIG. 13 is an explanatory view illustrating another exemplary configuration of the solid shape object that is formed by the solid shape forming system 1 according to the present embodiment.

As illustrated in FIG. 12, a solid shape object 210 may include a non-cultivation area 211 and a cultivation area 212. No plant is grown in the non-cultivation area 211 and the non-cultivation area 211 can be formed into any structure and using any material. Forming the non-cultivation area 211 as a structure that is not water permeable and that is densely filled enables formation of a mode like a pond 213 in which water is stored. Forming the non-cultivation area 211 into a shape of a rock, or the like, makes it possible to form a mode like a miniature of natural scenery. On the other hand, the cultivation area 212 is an area where a plant 214 is sown and grown and, as described above, the cultivation area 212 can be formed using the first material that deforms and is broken easily and that allows roots of plant to grow longer.

According to such a configuration, the solid shape forming system 1 is able to form the solid shape object 210 in which the plant 214 can be cultivated in the cultivation area 212 and scenery, such as the pond 213, a rocky area, a bridge, and a lamp, is provided in the non-cultivation area 211. The solid shape forming system 1 is able to form a solid shape object in which the cultivation area 212 where the plant 214 can be cultivated is provided in a part of a furniture with other usage and functions, such as a chair or a table.

As illustrated in FIG. 13, a solid shape object 220 may include a non-cultivation area 221 and a cultivation area 223 and an area 222 that is part of the surface of the cultivation area 223 may be formed using the first material. In other words, in the solid shape object 220 according to the present embodiment, the area that is formed using the first material that deforms and is broken easily may be only the surface (for example, approximately 1 cm to 3 cm) of the area where the plant is sown and grown. In order for the solid shape object 220 to hold the plant, as described above, it is important to form roots having thicknesses capable of supporting the plant at the point of contact between the solid shape object 220 and the plant. Thus, it is desirable that the surface of the area where the plant is sown and grown in the solid shape object 220 be formed using at least the first material to promote growth of the roots of the plant in the area. Accordingly, the solid shape object 220 is able to inhibit the plant to be grown from bending under its weight. In order to promote the roots to grow longer in the solid shape object 220, it is desirable that the inside of the area where the plant is to be sown and cultivated be also formed using the first material.

2.2. MODIFICATION

Figure 14A:
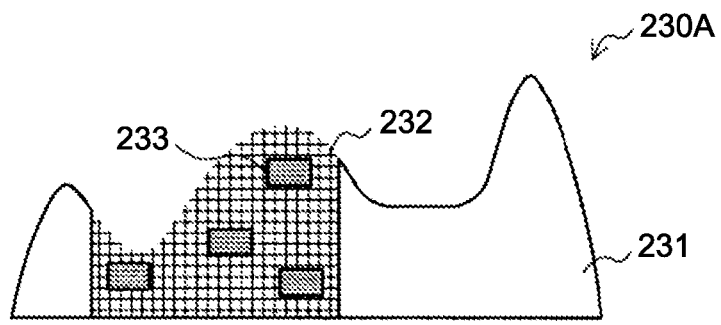
FIG. 14A is an explanatory view illustrating an exemplary modification of the solid shape object that is formed by the solid shape forming system.

With reference to FIGS. 14A to 16, a modification of the solid shape object that is formed by the solid shape forming system 1 according to the preset embodiment will be described more in detail. The modification of the solid shape object that is formed by the solid shape forming system 1 is an example where a structure to make up for water retention in the solid shape object is formed in the solid shape object. FIGS. 14A and FIG. 14B are explanatory views illustrating an exemplary modification of the solid shape object that is formed by the solid shape forming system 1 according to the present embodiment.

As illustrated in FIG. 14A, a solid shape object 230A may include a non-cultivation area 231 and a cultivation area 232 and, in the cultivation area 232, water receiving structures 233 capable of storing water may be further formed in the cultivation area 232. The water receiving structure 233 is, for example, a plate-shaped or cup-shaped structure that can retain water that is sprayed from above. Forming the structures in the cultivation area 232 enables the solid shape object 230A to greatly improve water retention of the cultivation area 232 that is formed into a three-dimensional meshed structure.

Figure 14B:
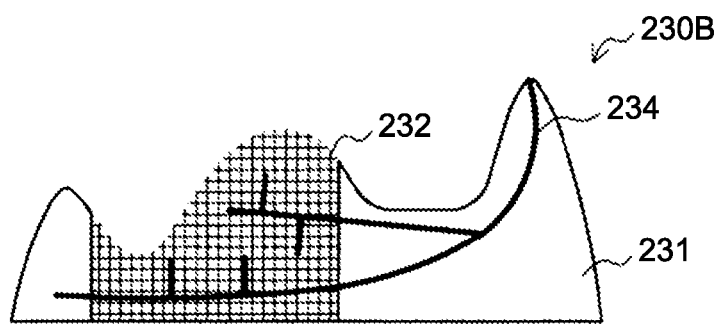
FIG. 14B is an explanatory view illustrating an exemplary modification of the solid shape object that is formed by the solid shape forming system.

Furthermore, as illustrated in FIG. 14B, a solid shape object 230B may include the non-cultivation area 231 and the cultivation area 232 and a flow channel structure 234 in which water flows may be further formed in the non-cultivation area 231 and the cultivation area 232. The flow channel structure 234 is, for example, a structure having a shape of a flow channel or a pipe into which water can be flown from the top. The water flown into the flow channel structure 234 is discharged from the end of the flow channel structure 234 in the cultivation area 232. Forming the structure in the non-cultivation area 231 and the cultivation area 232 enables the solid shape object 230B to supply only a required amount of water when required to the vicinity of roots of the plant having grown longer.

Figure 15A:
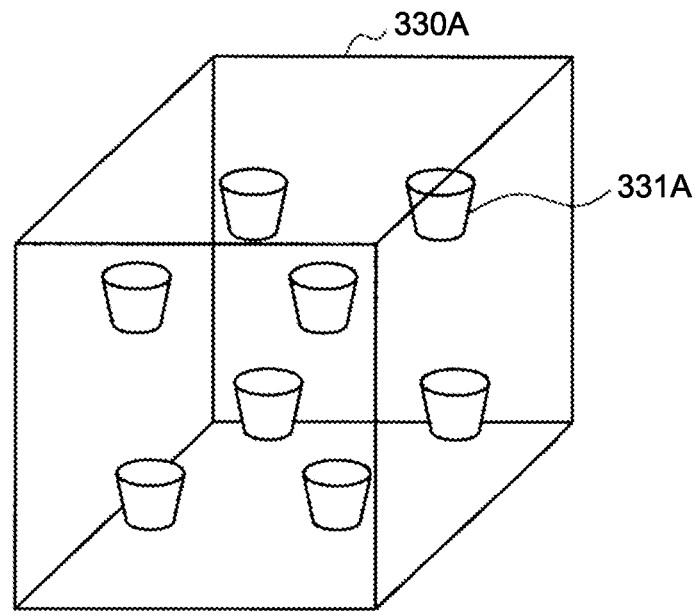
FIG. 15A is an explanatory view schematically illustrating a specific structure of a water receiving structure that is formed in the solid shape object.
Figure 15B:
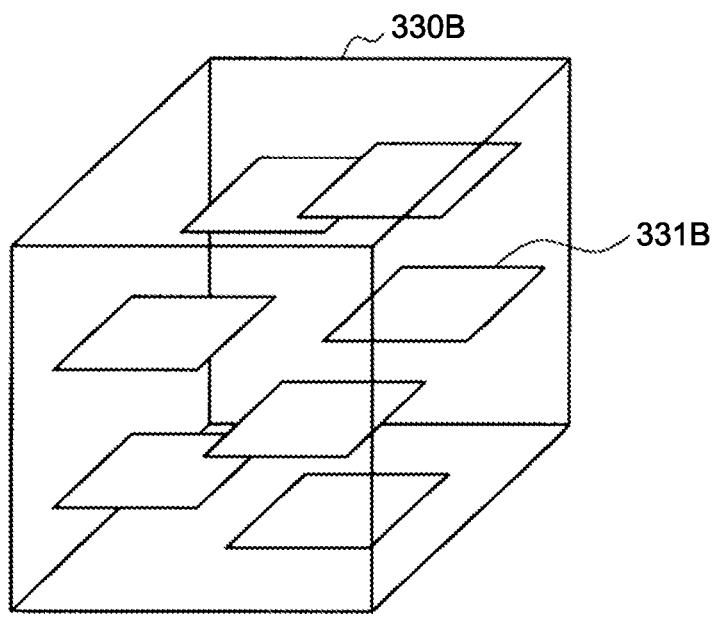
FIG. 15B is an explanatory view schematically illustrating a specific structure of the water receiving structure that is formed in the solid shape object.
Figure 15C:
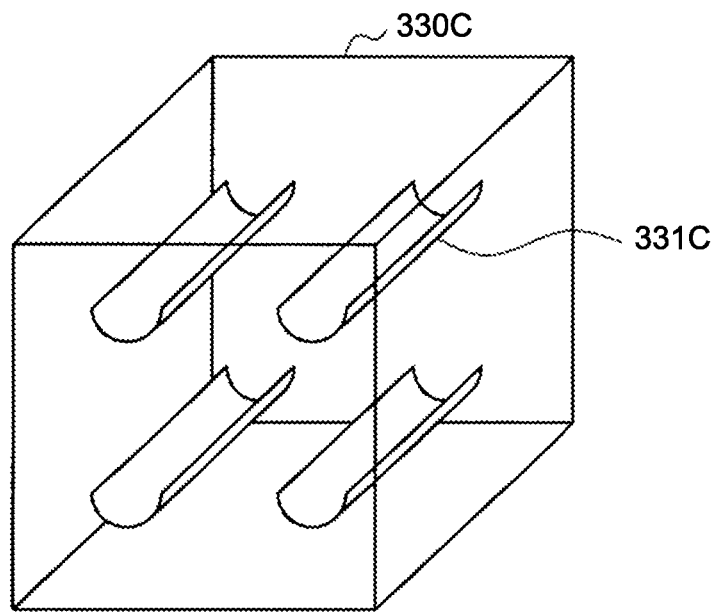
FIG. 15C is an explanatory view schematically illustrating a specific structure of the water receiving structure that is formed in the solid shape object.

With reference to FIGS. 15A to 15C, a specific structure of the water receiving structure explained using FIG. 14A will be further described. FIGS. 15A to 15C are explanatory views schematically illustrating structures of the water receiving structure that is formed in the solid shape object.

As illustrated in FIG. 15A, a plurality of water receiving structures 331A that are cup-shaped structures may be formed in a solid shape object 330A. The water receiving structures 331A store water that is sprayed from the upper side in the cups, thereby enabling great improvement in water retention of the solid shape object 330A.

As illustrated in FIG. 15B, a plurality of flat-shaped water receiving structures 331B may be formed in a solid shape object 330B. The water receiving structures 331B receive water that is sprayed from above, thereby enabling retention of water drops on the surfaces of the water receiving structures 331B by surface tension, etc. No side surface is formed in the water receiving structures 331B and thus the water receiving structures 331B do not store water in the structures and also do not store an excess quantity of water. Accordingly, the water receiving structures 331B make it possible to appropriately improve water retention of the solid shape object 330B.

As illustrated in FIG. 15C, a plurality of water receiving structures 331C each having a shape of halfpipe (a shape obtained by cutting a cylinder radially) may be formed in a solid shape object 330C. The water receiving structures 331C receives water that is sprayed from the top and thus are able to retain water drops on the inner curved surfaces of the water receiving structures 331C. The water receiving structures 331C does not store water in the structure but is able to store more water than that retained by the flat water receiving structure 331B. Accordingly, the water receiving structures 331C are able to improve water retention of the solid shape object 330C.

As illustrated in FIGS. 15A to 15C, the water receiving structures that are formed in the solid shape structure do not necessarily store water in the structures. It suffices if the water receiving structures that are formed in the solid shape object may be structures that at least have surfaces that are not water permeable (from which water does not leak). In such a case, as described using FIG. 15B, water drops are attached to the surfaces that are not water permeable, which enables the water receiving structures to improve water retention in the solid shape object.

Figure 16:
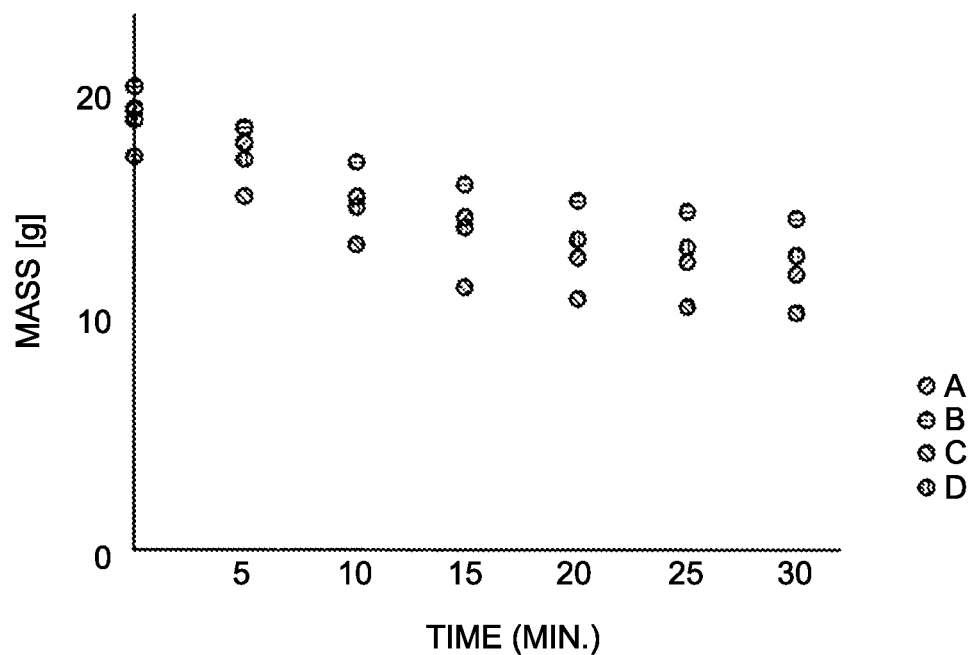
FIG. 16 is a graph representing change in mass of the solid shape object over time after spraying of water.

An effect that water retention of the solid shape object in which the water receiving structures are formed will be described with reference to FIG. 16. FIG. 16 is a graph representing change in mass of the solid shape object over time after spraying of water.

As for the keys in FIG. 16, A denotes a solid shape structure of a three-dimensional meshed structure whose size of meshes is 1.73 mm, B denotes a solid shape structure of a three-dimensional meshed structure whose size of meshes is 1.73 mm in which four cup-shaped water receiving structures are formed, C denotes a solid shape structure of a three-dimensional meshed structure whose size of meshes is 2.08 mm, and D denotes a solid shape structure of a three-dimensional meshed structure whose size of meshes is 2.08 mm in which four cup-shaped water receiving structures are formed. Note that all the solid shape structures A, B, C and D have a size of depth of 3 cm×width of 3 cm×height of 3 cm.

After g water is sufficiently sprayed to the solid shape objects A, B, C and D, changes in mass of the solid shape objects over time were observed. In other words, it is assumed that the mass decreases faster in solid shape objects with lower water retention because water flows out or vaporizes faster.

As illustrated in FIG. 16, the solid shape objects in which water receiving structures are formed have smaller decrease in mass associated with elapse of time than that in the solid shape objects in which no water receiving structure is formed. Accordingly, it is represented that forming the water receiving structures enables improvement in water retention in the solid shape objects. Comparing the solid shape objects A and B with the solid shape objects C and D represents that water retention can be improved by reducing the size of meshes of the three-dimensional meshed structure.

2.3. EXAMPLES

Figure 17:
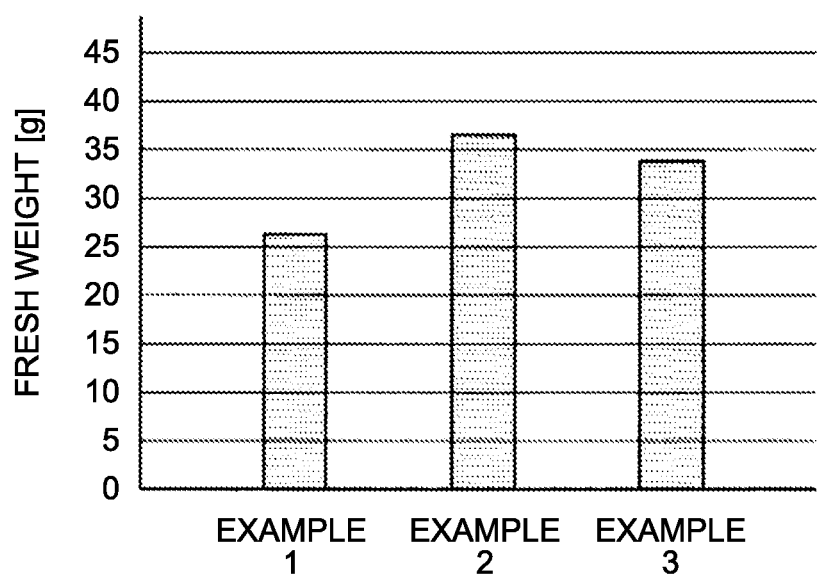
FIG. 17 is a histogram representing a result of measuring a fresh weight of part of a plant above the ground after 42 days from sowing of seeds.

With reference to FIG. 17, results of cultivating a plant (red leaf lettuce) using the solid shape objects according to the present embodiment will be represented below. FIG. 17 is a histogram representing a result of measuring the fresh weight of a part of the plant above the ground after 42 days from sowing of seeds. Note that the shape of the solid shape object in each of the following examples is a cylindrical shape whose diameter of the bottom surface is 4 cm and whose height is 4 cm.

A solid shape object according to Example 1 is a solid shape object in which the whole solid shape object is formed into a three-dimensional meshed structure using Lay-Felt that is the first material. The size of meshes of the three-dimensional structure of the solid shape object according to Example 1 is 1.73 mm.

A solid shape object according to Example 2 is a solid shape object in which the whole solid shape object is formed into a three-dimensional meshed structure using Lay-Felt that is the first material. In the solid shape object according to Example 2, the size of meshes of the three-dimensional meshed structure is changed gradually to be at 1.73 mm, 2.08 mm and 2.60 mm in each depth of 1.33 cm from the surface in which seeds are sown.

A solid shape object according to Example 3 is a solid shape object in which an area at 1.33 cm right under seeds of the plant that are sown in the solid shape object is formed into a three-dimensional structure using Lay-Felt that is the first material and other areas are formed into a three-dimensional meshed structure using PLA that is the second material. The size of meshes of the three-dimensional structure of the solid shape object according to Example 3 is 1.73 mm.

Note that Lay-Felt is a mixture of PVA and rubber elastomer that was purchased from FormFutura. After being formed, the solid shape object according to each of the examples was soaked into water for a day to turn the Lay-Felt, which is the first material, porous.

In FIG. 17, the column (also referred to as bottle) of each of the examples represents a fresh weight of the plant (not dried that is a weight right after cultivation) at a time after 42 days after sowing of seeds. The fresh weight was measured after cutting off the plant from the solid shape object at the roots and therefore the fresh weights do not contain the weight of the plant under the ground (roots) and the weight of the solid shape object. In the solid shape object according to each of the examples, the plant (red lettuce) was cultivated in an indoor condition at a temperature of 22° C., at a humidity of 50% or lower and with radiation with a LED (Light Emitting Diode) and a sufficient amount of water was supplied.

As illustrated in FIG. 17, it is represented that growth of plant is promoted more in the solid shape object according to Example 2 in which the size of meshes of the three-dimensional meshed structure is changed gradually than in the solid shape objects according to Example 1 and Example 3. In comparison between the solid shape object according to Example 1 and the solid shape object according to Example 3, the degrees of growth of plant are approximately equal to each other. The result represents that forming the area right under the seeds of plant that are sown using the first material that deforms or is broken easily makes it possible to grow the plant without making the plant be bent under its weight.

3. HARDWARE

Figure 18:
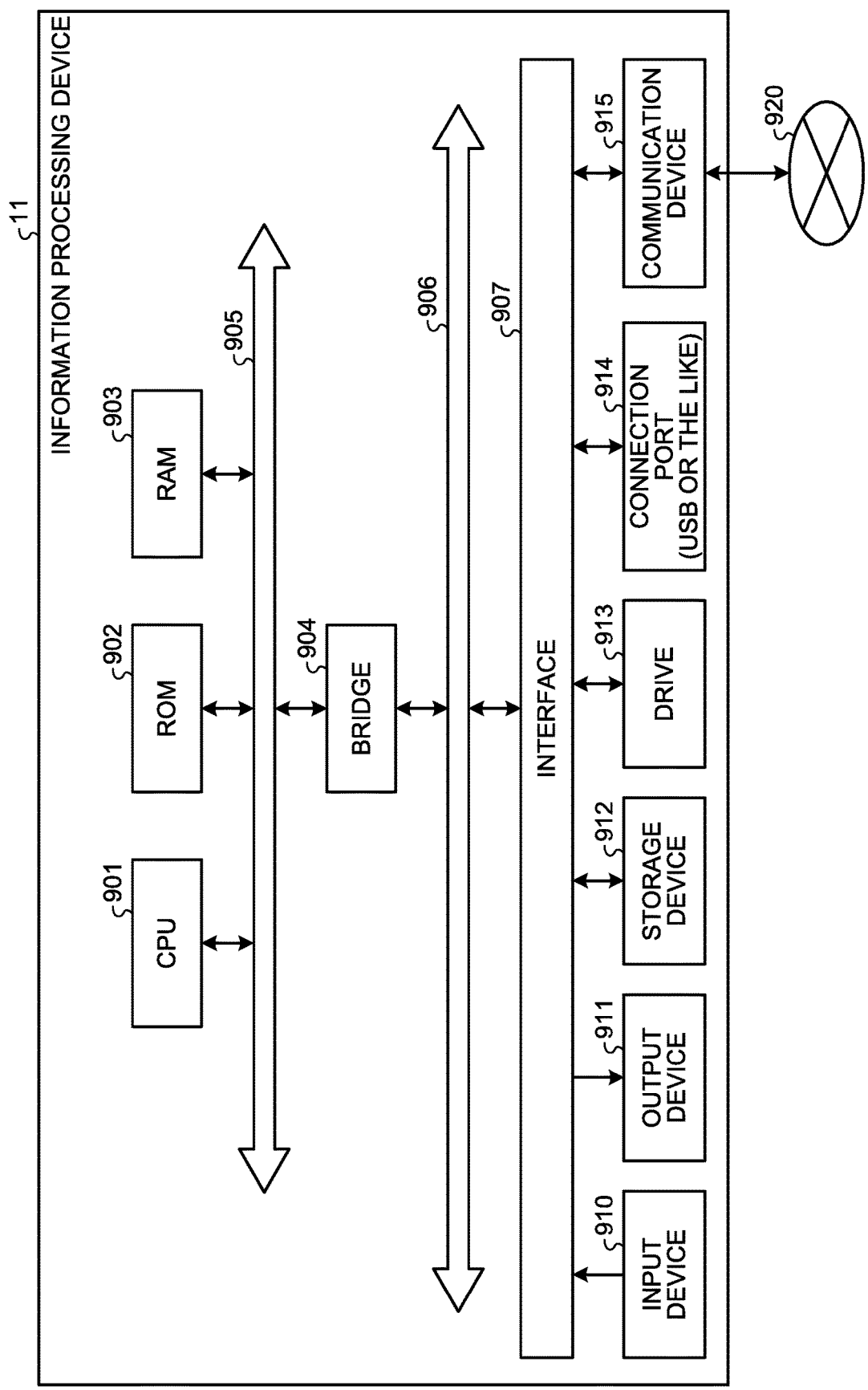
FIG. 18 is a block diagram illustrating an exemplary hardware configuration of an information processing device included in the solid shape forming system according to the present embodiment.

With reference to FIG. 18, a hardware configuration of the information processing device 11 included by the solid shape forming system according to the embodiment of the disclosure will be described. FIG. 18 is a block diagram illustrating an exemplary hardware configuration of the information processing device 11 included by the solid shape forming system according to the present embodiment. The information processing that is executed by the information processing device 11 is achieved by cooperation between hardware and software.

As illustrated in FIG. 18, the information processing device 11 includes a CPU (Central Processing Unit) 901, a ROM (Read Only Memory) 902, a RAM (Random Access Memory) 903, a bridge 904, internal buses 905 and 906, an interface 907, an input device 910, an output device 911, a storage device 912, a drive 913, a connection port 914, and a communication device 915.

The CPU 901 functions as a processing unit and a control device and, according to a program that is stored in a ROM 902, or the like, controls general operations of the information processing device 11. The ROM 902 stores a program and operational parameters that are used by the CPU 901 and the RAM 903 temporarily stores the program that is used for execution by the CPU 901 and the parameters that appropriately change in the execution. For example, the CPU 901 may implement functions of the forming information generator 130 and the layer divider 140.

The CPU 901, the ROM 902 and the RAM 903 are connected with one another via the bridge 904, the internal buses 905 and 906, etc. The CPU 901, the ROM 902 and the RAM 903 are connected also with the input device 910, the output device 911, the storage device 912, the drive 913, the connection port 914 and the communication device 915 via the interface 907.

The input device 910 is formed of an input device to which information is input, such as a touch panel, a keyboard, a button, a microphone, a switch and a lever, and an input control circuit for generating an input signal based on input made by the user and outputting the input signal to the CPU 901.

The output device 911 includes a display device, such as a liquid crystal display device, an organic EL display device and a lamp, and an audio output device, such as a speaker and headphones. For example, the display device displays a generated image and the audio output device converts the audio data, or the like, into sound and outputs the sound.

The storage device 912 is a device for storing data that is configured as an exemplary storage of the information processing device 11. The storage device 912 may include a storage medium, a storage device that stores data in the storage medium, a read device that reads the data from the storage medium, and a deleting device that deletes the stored data.

The drive 913 is a storage media read-writer. The drive 913 reads information that is stored in a removable storage medium that is inserted into the drive 913, such as a semiconductor memory, and outputs the information to the RAM 903. The drive 913 is able to write information in the removable storage medium.

The connection port 914 is a connection interface that is formed of a connection port for connecting an external connection device, such as an USB port or an optical audio terminal.

The communication device 915 is, for example, a communication interface formed of a communication device, or the like, for connecting to a network 920, such as a public network or a dedicated network. The communication device 915 may be a wired or wireless LAN enabled communication device or may be a wired cable communication device.

For example, the connection port 914 and the communication device 915 may implement functions of the contour information acquisition unit 110, the vegetation information acquisition unit 120, and the output unit 150.

It is possible to create a computer program to cause another information processing device including hardware, such as a CPU, a ROM and a RAM, to implement functions equivalent to the components of the information processing device 11 according to the above-described embodiment. A storage medium that stores the computer program is also provided.

4. CONCLUSION

As described above, according to the solid shape object forming system according to the embodiment of the disclosure, it is possible to form a solid shape object in which an area where a plant to be cultivated is formed using the first material that deforms or is broken easily.

According to the solid shape information generation system according to the embodiment of the disclosure, it is possible to generate forming information for a 3D printer, or the like, to form a solid shape object in which a plant can be sown and cultivated.

The disclosed preferable embodiment has been described in detail with reference to the accompanying drawings; however, the technical scope of the disclosure is not limited to the example. It is obvious that those with general knowledge in the technical field of the disclosure can reach various exemplary modifications or exemplary corrections within the scope of technical idea described in the claims and it is understood that they naturally belong to the technical scope of the disclosure.

The effects disclosed herein are explanatory and exemplary and thus are not definitive. In other words, the technique according to the disclosure can achieve, together with the above-described effect or instead of the above-described effect, other effects obvious to those skilled in the art from description herein.

Note that the following configuration also belongs to the technical scope of the disclosure.

(1)

A solid shape information generation system comprising:
a forming information generator that generates forming information to form a solid shape object used to cultivate a plant using a first material and a second material based on information representing the solid shape object and form an area where at least the plant is sown using the first material whose tensile strength is lower than that of the second material; and
an output unit that outputs the forming information for a solid shape forming unit to form the solid shape object.

(2)

The solid shape information generation system according to (1), wherein the area where at least the plant is sown is formed into a three-dimensional meshed structure.

(3)

The solid shape information generation system according to (2), wherein meshes of the three-dimensional meshed structure are more coarse inside than on a surface where the plant is sown.

(4)

The solid shape information generation system according to (2) or (3), wherein the three-dimensional meshed structure is formed by alternately depositing a layer containing a plurality of lines extended in a direction and a layer containing a plurality of lines extended in a direction orthogonal to the lines.

(5)

The solid shape information generation system according to any one of (2) to (4), wherein at least one water receiving structure is provided in the three-dimensional meshed structure.

(6)

The solid shape information generation system according to (5), wherein the water receiving structure at least contains a water-impermeable surface.

(7)

The solid shape information generation system according to any one of (1) to (6), wherein the solid shape object is an alternative to soil.

(8)

The solid shape information generation system according to any one of (1) to (7), wherein the output unit divides the forming information into layers extending horizontally and outputs the divided information.

(9)

The solid shape information generation system according to any one of (1) to (8), further comprising the solid shape forming unit.

(10)

The solid shape information generation system according to any one of (1) to (9), wherein the first material has a lower adhesive strength between layers than that of the second material.

(11)

The solid shape information generation system according to any one of (1) to (10), wherein the first material has a lower Young's modulus than that of the second material.

(12)

The solid shape information generation system according to any one of (1) to (11), wherein the first material is a material that is turned porous before the plant is sown.

(13)

The solid shape information generation system according to (12), wherein the first material is a mixture of a water-soluble resin material and a water-insoluble resin material.

(14)

The solid shape information generation system according to any one of (1) to (13), wherein the first material and the second material are thermoplastic resins or light curing resins.

(15)

A solid shape forming apparatus comprising:
an information acquisition unit that acquires information representing a solid shape object that is used to cultivate a plant;
a forming information generator that generates forming information to form the solid shape object using a first material and a second material based on the information, which is acquired by the information acquisition unit, and form an area where at least the plant is sown using the first material whose tensile strength is lower than that of the second material; and a solid shape forming unit that forms the solid shape object based on the forming information.

(16)

A solid shape information generation method comprising:
using a circuit, generating forming information to form a solid shape object used to cultivate a plant using a first material and a second material based on information representing the solid shape object and form an area where at least the plant is sown using the first material whose tensile strength is lower than that of the second material; and outputting the forming information for the solid shape forming unit to form the solid shape object.

(17)

A program that causes a computer to function as a forming information generator that generates forming information to form a solid shape object used to cultivate a plant using a first material and a second material based on information representing the solid shape object and form an area where at least the plant is sown using the first material whose tensile strength is lower than that of the second material.

REFERENCE SIGNS LIST

1 SOLID SHAPE FORMING SYSTEM
2 SOLID SHAPE OBJECT
10 DESIGN CREATING DEVICE
11 INFORMATION PROCESSING DEVICE
12 PRINTER
13 RAIL
100 DESIGN UNIT
110 CONTOUR INFORMATION ACQUISITION UNIT
120 VEGETATION INFORMATION ACQUISITION UNIT
130 FORMING INFORMATION GENERATOR
140 LAYER DIVIDER
150 OUTPUT UNIT
160 SOLID SHAPE FORMING UNIT
170 SEED SOWING UNIT

The invention claimed is:

1. A solid shape information generation system comprising:
a forming information generator configured to generate forming information to form a solid shape object used to cultivate a plant using a first material and a second material based on information representing the solid shape object and form an area where at least the plant is sown using the first material whose tensile strength is lower than that of the second material;
an output unit configured to output, to a solid shape forming unit configured to form the solid shape object based on the forming information, the forming information for each layer of a plurality of layers of the solid shape object for the solid shape forming unit to form the solid shape object layer by layer for the plurality of layers; and
the solid shape forming unit configured to form the solid shape object based on the forming information,
wherein the area where at least the plant is sown using the first material is an innermost area of the solid shape object,
wherein an outer circumferential area positioned outside of the area where at least the plant is sown is formed using the second material,
wherein an adhesive strength between layers of the first material of the plurality of layers is lower than an adhesive strength between layers of the second material of the plurality of layers, and
wherein the forming information generator, the output unit, and the solid shape forming unit are each implemented via at least one processor.

2. The solid shape information generation system according to claim 1, wherein the area where at least the plant is sown is formed into a three-dimensional meshed structure.

3. The solid shape information generation system according to claim 2, wherein meshes of the three-dimensional meshed structure are more coarse inside than on a surface where the plant is sown.

4. The solid shape information generation system according to claim 2, wherein the three-dimensional meshed structure is formed by alternately depositing a layer containing a plurality of lines extended in a direction and a layer containing a plurality of lines extended in a direction orthogonal to the lines.

5. The solid shape information generation system according to claim 2, wherein at least one water receiving structure is provided in the three-dimensional meshed structure.

6. The solid shape information generation system according to claim 5, wherein the water receiving structure at least contains a water-impermeable surface.

7. The solid shape information generation system according to claim 2, wherein the three-dimensional meshed structure includes an upper part and a lower part lower than the upper part, and
wherein a size of the meshes in the lower part is larger than a size of meshes in the upper part.

8. The solid shape information generation system according to claim 1, wherein the solid shape object is an alternative to soil.

9. The solid shape information generation system according to claim 1, wherein the output unit divides the forming information into layers extending horizontally and outputs the divided information.

10. The solid shape information generation system according to claim 1, wherein the first material has a lower Young's modulus than that of the second material.

11. The solid shape information generation system according to claim 1, wherein the first material is a material that is turned porous before the plant is sown.

12. The solid shape information generation system according to claim 11, wherein the first material is a mixture of a water-soluble resin material and a water-insoluble resin material.

13. The solid shape information generation system according to claim 1, wherein the first material and the second material are thermoplastic resins or light curing resins.

14. A solid shape forming apparatus comprising:
an information acquisition unit configured to acquire information representing a solid shape object that is used to cultivate a plant;
a forming information generator configured to generate forming information for each layer of a plurality of layers of the solid shape object to form the solid shape object using a first material and a second material based on the information, which is acquired by the information acquisition unit, and form an area where at least the plant is sown using the first material whose tensile strength is lower than that of the second material; and a solid shape forming unit configured to form the solid shape object based on the forming information, wherein the area where at least the plant is sown using the first material is an innermost area of the solid shape object, wherein an outer circumferential area positioned outside of the area where at least the plant is sown is formed using the second material, wherein an adhesive strength between layers of the first material of the plurality of layers is lower than an adhesive strength between layers of the second material of the plurality of layers, and wherein the information acquisition unit, the forming information generator, and the solid shape forming unit are each implemented via at least one processor.

15. A solid shape information generation method comprising:

using a circuit, generating forming information to form a solid shape object used to cultivate a plant using a first material and a second material based on information representing the solid shape object and form an area where at least the plant is sown using the first material whose tensile strength is lower than that of the second material;

outputting, to a circuitry configured to form the solid shape object based on the forming information, the forming information for each layer of a plurality of layers of the solid shape object for the circuitry to form the solid shape object layer by layer for the plurality of layers; and forming, by the circuitry, the solid shape object based on the forming information, wherein the area where at least the plant is sown using the first material is an innermost area of the solid shape object, wherein an outer circumferential area positioned outside of the area where at least the plant is sown is formed using the second material, and wherein an adhesive strength between layers of the first material of the plurality of layers is lower than an adhesive strength between layers of the second material of the plurality of layers.

16. A non-transitory computer-readable medium having embodied thereon a program, which when executed by a computer causes the computer to execute a solid shape information generation method, the method comprising:

generating forming information to form a solid shape object used to cultivate a plant using a first material and a second material based on information representing the solid shape object and form an area where at least the plant is sown using the first material whose tensile strength is lower than that of the second material;

outputting, to a circuitry configured to form the solid shape object based on the forming information, the forming information for each layer of a plurality of layers of the solid shape object for the solid shape forming unit to form the solid shape object layer by layer for the plurality of layers; and forming, by the circuitry, the solid shape object based on the forming information, wherein the area where at least the plant is sown using the first material is an innermost area of the solid shape object, wherein an outer circumferential area positioned outside of the area where at least the plant is sown is formed using the second material, and wherein an adhesive strength between layers of the first material of the plurality of layers is lower than an adhesive strength between layers of the second material of the plurality of layers.

* * * * *